United States Patent [19]

Asghar et al.

[11] Patent Number: 5,200,912
[45] Date of Patent: Apr. 6, 1993

[54] APPARATUS FOR PROVIDING POWER TO SELECTED PORTIONS OF A MULTIPLYING DEVICE

[75] Inventors: Safdar M. Asghar, Austin, Tex.; Donald D. Mondul, Naperville, Ill.

[73] Assignee: Advanced Micro Devices, Inc., Sunnyvale, Calif.

[21] Appl. No.: 924,346

[22] Filed: Aug. 3, 1992

Related U.S. Application Data

[63] Continuation-in-part of Ser. No. 794,995, Nov. 19, 1991, Pat. No. 5,136,537.

[51] Int. Cl.$^5$ ............................ G06F 1/00; G06F 7/52
[52] U.S. Cl. ...................................... 364/707; 364/754
[58] Field of Search ............................ 364/754-760, 364/707

[56] References Cited

U.S. PATENT DOCUMENTS 4,982,355 1/1991 Nishimura et al. ............. 364/707 X
5,010,510 4/1991 Nishimura et al. ............. 364/707 X

*Primary Examiner*—Tan V. Mai
*Attorney, Agent, or Firm*—Foley & Lardner

[57] ABSTRACT

An apparatus for controlling power delivery from a power source to selected portions of a multiplying device for determining the product of a first number having a first plurality of digits and a second number having a second plurality of digits. The multiplying device includes a plurality of components which include a plurality of multiplier units for determining a plurality of partial products and a register unit for storing information, the register unit including plurality of register cells for accumulatingly storing the partial products according to a predetermined arrangement; the apparatus includes: a power bus for providing controllable delivery paths for delivering the power from the power source to the multiplying device; and a control unit for controlling the delivery paths to selectively effect operational connection between specified components and the power source. The control unit includes a logic unit for comparing the first number with the second number and determining the greater number of digits between the first number and the second number. The control unit employs the greater number of digits to selectively provide the power to specified components of the plurality of components.

8 Claims, 7 Drawing Sheets

FIG. 2

COL., ROW (m,n)

| Σm+n | $r_x$ | $r_1$ | $r_2$ | $r_3$ | $r_4$ | $r_5$ | $r_6$ | $r_7$ | $r_8$ | $r_9$ | $r_{10}$ | $r_{11}$ | $r_{12}$ | $r_{13}$ | $r_{14}$ | $r_{15}$ |
|---|---|---|---|---|---|---|---|---|---|---|---|---|---|---|---|---|
| 2 | | 1,1 | | | | | | | | | | | | | | |
| 3 | | 2,1 | 1,2 | | | | | | | | | | | | | |
| 4 | | 3,1 | 2,2 | 1,3 | | | | | | | | | | | | |
| 5 | | 4,1 | 3,2 | 2,3 | 1,4 | | | | | | | | | | | |
| 6 | | 5,1 | 4,2 | 3,3 | 2,4 | 1,5 | | | | | | | | | | |
| 7 | | 6,1 | 5,2 | 4,3 | 3,4 | 2,5 | 1,6 | | | | | | | | | |
| 8 | | 7,1 | 6,2 | 5,3 | 4,4 | 3,5 | 2,6 | 1,7 | | | | | | | | |
| 9 | | 8,1 | 7,2 | 6,3 | 5,4 | 4,5 | 3,6 | 2,7 | 1,8 | | | | | | | |
| 10 | | 9,1 | 8,2 | 7,3 | 6,4 | 5,5 | 4,6 | 3,7 | 2,8 | 1,9 | | | | | | |
| 11 | | 10,1 | 9,2 | 8,3 | 7,4 | 6,5 | 5,6 | 4,7 | 3,8 | 2,9 | 1,10 | | | | | |
| 12 | | 11,1 | 10,2 | 9,3 | 8,4 | 7,5 | 6,6 | 5,7 | 4,8 | 3,9 | 2,10 | 1,11 | | | | |
| 13 | | 12,1 | 11,2 | 10,3 | 9,4 | 8,5 | 7,6 | 6,7 | 5,8 | 4,9 | 3,10 | 2,11 | 1,12 | | | |
| 14 | | 13,1 | 12,2 | 11,3 | 10,4 | 9,5 | 8,6 | 7,7 | 6,8 | 5,9 | 4,10 | 3,11 | 2,12 | 1,13 | | |
| 15 | | 14,1 | 13,2 | 12,3 | 11,4 | 10,5 | 9,6 | 8,7 | 7,8 | 6,9 | 5,10 | 4,11 | 3,12 | 2,13 | 1,14 | |
| 16 | | 15,1 | 14,2 | 13,3 | 12,4 | 11,5 | 10,6 | 9,7 | 8,8 | 7,9 | 6,10 | 5,11 | 4,12 | 3,13 | 2,14 | |

APPARATUS FOR PROVIDING POWER TO SELECTED PORTIONS OF A MULTIPLYING DEVICE

This is a continuation-in-part of application U.S. Ser. No. 07/794,995, filed Nov. 19, 1991, which will issue as U.S. Pat. No. 5,136,537 on Aug. 4, 1992.

BACKGROUND OF THE INVENTION

The present invention is directed to a method for determining the product of two numbers and an apparatus for carrying out that method.

In a computing system employing solid state components, preferably constructed from silicon components arrayed on a substrate, certain basic design criteria generally apply. For example, it is desired that the least space possible upon the substrate be occupied by each component. Further, it is desired that energy consumed by the apparatus be minimized as much as possible, especially in battery-supplied systems. Also, it is desired that the computing system operate as speedily as possible.

A multiplier for such computing systems is generally fashioned of a matrix of switching transistors, which matrix is of sufficient size to accommodate the maximum expected size of numbers to be handled by the computing apparatus. Thus, for example, in order to have a multiplication of a 4-digit number by a 4-digit number, a multiplier would necessarily comprise a 16×16 bit matrix (i.e., 16 columns of transistors, each column having 16 rows of transistors) with additional rows, or columns, or both to accommodate carries and other overhead operations involved in multiplication.

For smaller numbers, higher significance bits within the multiplier matrix are zero-filled as appropriate to correctly store the multiplicand and the multiplier involved in the multiplication operation. However, those zero-filled bits must still be powered-up in order to effect such zero-filling. Such zero-filled bits are necessarily involved in the calculations effected by the multiplier, so speed of operation, power requirements, and "real estate" (i.e., space) occupancy on the substrate are all sacrificed in accommodating larger numbers for multiplication operations.

It would be advantageous to have a multiplier which only powers-up a sufficient number of bits necessary for a specific multiplication operation to conserve power, especially in a battery-supplied system. It would be further advantageous to have a multiplier which occupies as little "real estate" as possible on the substrate in order to conserve space and enhance packaging of a system employing the multiplier. It would be still further advantageous to have a multiplier which speedily effects multiplication operations to enhance the operational speed of a system employing the multiplier.

It would also be advantageous to effect multiplication by a method which facilitates design and operation of a multiplier which can realize the above-described desired advantages.

SUMMARY OF THE INVENTION

The present invention includes a method for determining the product of a first number and a second number, which first number has a plurality of first digits hierarchically arranged from a first least-significant place to a first most-significant place, and which second number has a plurality of second digits hierarchically arranged from a second least-significant place to a second most-significant place. The method comprises, in its preferred embodiment, the steps of:

(1) determining a plurality of partial products (treating blank places of the shorter number as zeroes); the plurality of partial products comprising respective partial products for each pair-combination of the first digits and second digits of the respective numbers, thereby establishing a combinational significance determined by the significance of the first digit and the significance of the second digit of the pair-combination involved in each respective partial product;

(2) providing a register having a plurality of register cells for storing accumulated values, which register cells have hierarchical significance;

(3) accumulating selected of the respective partial products to produce accumulated values in specified of the register cells according to the following relationships:

$$P_{m,n} \text{—[accumulates in]} \rightarrow r_x; \ x = (m+n) - 1$$

where "$P_{m,n}$" represents the respective partial product; "m" represents the first significance (m=1, 2, . . . ); "n" represents the second significance (n=1, 2, . . . ); and "r" represents a specified register cell having significance "x";

(4) effecting a shifting accumulation operation comprising shifting specific digits of the accumulated value stored in a lesser-significant register cell to the next-higher-significant register cell containing an accumulated value, and adding the specific digits to the accumulated value stored in the next-higher-significant register cell as least-significant digits; the specific digits being those digits of the accumulated value stored in the lesser-significant register cell having higher significance than the least-significant digit of the accumulated value; the shifting accumulation operation being effected sequentially between significance-adjacent register cells from the least-significant register cell to the most-significant register cell within the register; and (5) reading the contents of the plurality of register cells to ascertain the product.

A further aspect of the present invention includes an apparatus for practicing the above-described method, which apparatus, in its preferred embodiment, comprises a logic circuit for determining the respective partial products for each pair-combination of the plurality of first digits and the plurality of second digits; a register having a plurality of register cells for storing accumulated values, which register cells have a hierarchical significance; and an accumulating circuit for accumulating selected of the respective partial products to produce accumulated values, the accumulating circuit storing the accumulated values in specified register cells according to the relationships expressed above.

It is, therefore, an object of the present invention to provide a method and apparatus for determining the product of two numbers which facilitate powering-up only sufficient components necessary for a specific multiplication operation to conserve power consumption.

It is a further object of the present invention to provide a method and apparatus for determining the product of two numbers which efficiently occupies space on a substrate in a system employing the apparatus.

Yet a further object of the present invention is to provide a method and apparatus for determining the product of two numbers which speedily effects multiplication operations to enhance the operational speed of a system employing the apparatus.

Further objects and features of the present invention will be apparent from the following specification and claims when considered in connection with the accompanying drawings illustrating the preferred embodiment of the invention.

BRIEF DESCRIPTION OF THE DRAWINGS

FIG. 2 is a table illustrating the assignment of accumulated values to respective register cells according to the method of the present invention.

FIG. 7 is a schematic block diagram of an apparatus for carrying out the preferred embodiment of the method of the present invention.

DETAILED DESCRIPTION OF THE INVENTION

Figure 1:
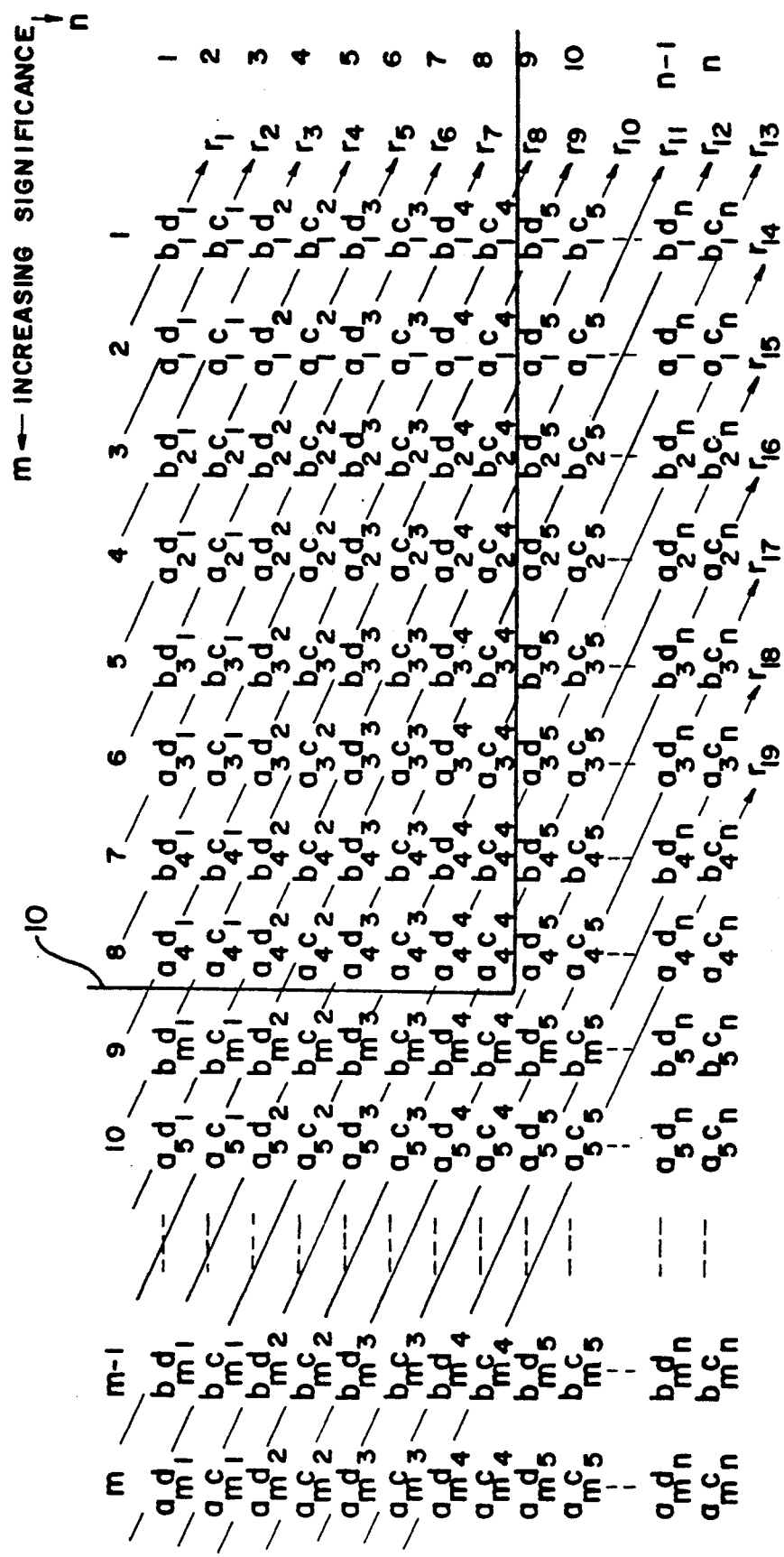
FIG. 1 is a representation of a generalized matrix for determining register set-ups according to the first embodiment of the method of the present invention.

Traditional high speed data signal processing apparatuses employ high speed multipliers to execute algorithms for purposes of such functions as speech compression, operation of high speed modems, operation of digital filters, and the like. Typically, the multipliers employed for such functions are large (on the order of a $16 \times 16$ bit array) and involve high power consumption, large die area ("real estate" occupancy on the substrate), and high precision. Other uses of multipliers, such as arithmetic logic units, generally suffer from the same disadvantages—high power consumption and large die area—in order to maintain high speed operation, and the disadvantages are exacerbated with requirements for higher speed, higher precision, and larger numbers.

The present invention includes a method for determining the product of two numbers (i.e., a method for multiplication) which comprises a distribution of multiplying operations among a plurality of smaller multipliers than the size of multiplier which would be required for multiplying with a single multiplier. Such distributive processing maintains speed of operation and precision of results while providing for a lesser die area requirement and affording the opportunity to only power-up the particular multiplying units in the distributive processing arrangement required for the particular multiplicand and multiplier involved in a specific multiplication operation.

Generally, the method involves the generation of partial products of portions of the multiplicand and multiplier, which partial products each individually require a smaller multiplier unit, and effecting a shifting accumulation operation in a register in which the partial products have been accumulated according to particular respective significances of the digits of the multiplicand and the digits of the multiplier.

In order to facilitate understanding of the terms used in describing the method of the present invention, the following terms are illustrated.

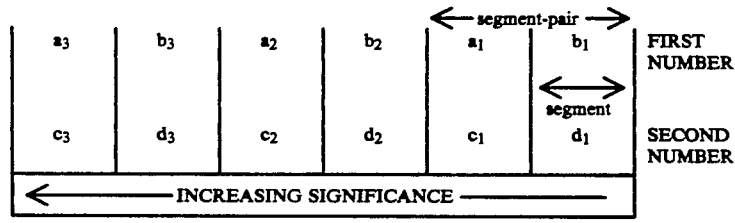

| | | | | ←─ segment-pair ─→ | | |
|---|---|---|---|---|---|---|
| $a_3$ | $b_3$ | $a_2$ | $b_2$ | $a_1$ | $b_1$ | FIRST NUMBER |
| | | | | | ←→ segment | |
| $c_3$ | $d_3$ | $c_2$ | $d_2$ | $c_1$ | $d_1$ | SECOND NUMBER |
| ←──────── INCREASING SIGNIFICANCE ──────── | | | | | | |

| FIRST ADDITIVE COMPRESSIONS | FIRST SUBTRACTIVE COMPRESSIONS | SECOND ADDITIVE COMPRESSIONS | SECOND SUBTRACTIVE COMPRESSIONS |
|---|---|---|---|
| $(a_1 + b_1)$ | $(a_1 - b_1)$ | $(c_1 + d_1)$ | $(c_1 - d_1)$ |
| $(a_2 + b_2)$ | $(a_2 - b_2)$ | $(c_2 + d_2)$ | $(c_2 - d_2)$ |
| $(a_3 + b_3)$ | $(a_3 - b_3)$ | $(c_3 + d_3)$ | $(c_3 - d_3)$ |
| . | . | . | . |
| . | . | . | . |
| $(a_m + b_m)$ | $(a_m - b_m)$ | $(c_n + d_n)$ | $(c_n - d_n)$ |

Primary Partial Products: $P1_{m,n}$

| | | | |
|---|---|---|---|
| $b_1 d_1$ | $b_2 d_1$ | ... | $b_m d_1$ |
| $b_1 d_2$ | $b_2 d_2$ | ... | $b_m d_2$ |
| $b_1 d_3$ | $b_2 d_3$ | ... | $b_m d_3$ |
| . | . | | . |

-continued

| | $b_1 d_n$ | $b_2 d_n$ | ... | $b_m d_n$ |
|---|---|---|---|---|

Secondary Partial Products: $P2_{m,n}$

| $(a_1 + b_1)(c_1 + d_1)$ | $(a_2 + b_2)(c_1 + d_1)$ | ... | $(a_m + b_m)(c_1 + d_1)$ |
|---|---|---|---|
| $(a_1 + b_1)(c_2 + d_2)$ | $(a_2 + b_2)(c_2 + d_2)$ | ... | $(a_m + b_m)(c_2 + d_2)$ |
| $(a_1 + b_1)(c_3 + d_3)$ | $(a_2 + b_2)(c_3 + d_3)$ | ... | $(a_m + b_m)(c_3 + d_3)$ |
| . | . | | . |
| . | . | | . |
| $(a_1 + b_1)(c_n + d_n)$ | $(a_2 + b_2)(c_n + d_n)$ | ... | $(a_m + b_m)(c_n + d_n)$ |

Tertiary Partial Products: $P3_{m,n}$

| $(a_1 - b_1)(c_1 - d_1)$ | $(a_2 - b_2)(c_1 - d_1)$ | ... | $(a_m - b_m)(c_1 - d_1)$ |
|---|---|---|---|
| $(a_1 - b_1)(c_2 - d_2)$ | $(a_2 - b_2)(c_2 - d_2)$ | ... | $(a_m - b_m)(c_2 - d_2)$ |
| $(a_1 - b_1)(c_3 - d_3)$ | $(a_2 - b_2)(c_3 - d_3)$ | ... | $(a_m - b_m)(c_3 - d_3)$ |
| . | . | | . |
| . | . | | . |
| $(a_1 - b_1)(c_n - d_n)$ | $(a_2 - b_2)(c_n - d_n)$ | ... | $(a_m - b_m)(c_n - d_n)$ |

Additive Factor: $F_{m,n}^{+}$ $$F_{m,n}^{+} = [(P2_{m,n} + P3_{m,n}) \div 2] - P1_{m,n}$$

Subtractive Factor: $F_{m,n}^{-}$ $$F_{m,n}^{-} = (P2_{m,n} - P3_{m,n}) \div 2$$

According to a first embodiment of the method of the present invention, a first number and a second number are multiplied. The first number has a plurality of first digits hierarchically arranged from a least-significant place to a most-significant place, and the second number has a plurality of second digits hierarchically arranged from a least-significant place to a most-significant place. The most-significant places of the shorter of the two numbers are zero-filled appropriately that the first and second numbers occupy a like number of places. The first number is segmented into at least one first segment-pair, each of which first segment-pairs being representable by an expression "$a_m, b_m$", where "a" represents a higher-significance first segment of a respective first segment-pair and "b" represents a lower-significance first segment of the respective first segment-pair ("m" = 1, 2, 3, ...). "m" represents the significance of the respective first segment-pair within the first number. The second number is similarly segmented into at least one second segment-pair, each of which second segment-pairs being representable by an expression "$c_n, d_n$", where "c" represents a higher-significance second segment of a respective second segment-pair and "d" represents a lower-significance second segment of a respective second segment-pair ("n" = 1, 2, 3, ...). "n" represents the significance of the respective second segment-pair within the second number. Thus, the two numbers are segmented into an equal number of segment-pairs, and each of the first segments and second segments, for a given span of significance, comprise an equal number of digits.

An additive compression is calculated for each of the first segment-pairs and each of the second segment-pairs. That is, a first additive compression for each of the first segment-pairs, representable by an expression "$(a_m + b_m)$", and a second additive compression for each of the second segment-pairs, representable by an expression "$(c_n + d_n)$", are calculated. Similarly, a first subtractive compression for each of the first segment-pairs, representable by an expression "$(a_m - b_m)$", and a second subtractive compression for each of the second segment-pairs, representable by an expression "$(c_n - d_n)$", are also calculated.

A set of primary partial products, comprising the products of each lesser-significance segment of each of the first segment-pairs with each lesser-significance segment of each of the second segment-pairs, is calculated. Each primary partial product is representable by an expression "$P1_{m,n}$", where $P1_{m,n} = b_m d_n$, and "m,n" establishes a combinational significance for each of the primary partial products.

A set of secondary partial products, comprising the products of each of the first additive compressions with each of the second additive compressions, is calculated. Each of the secondary partial products is representable by an expression "$P2_{m,n}$", where $P2_{m,n} = (a_m + b_m)(c_n + d_n)$, and "m,n" establishes a combinational significance for each of the secondary partial products.

A set of tertiary partial products, comprising the products of each of the first subtractive compressions with each of the second subtractive compressions, is calculated. Each of the tertiary partial products is representable by an expression "$P3_{m,n}$", where $P3_{m,n} = (a_m - b_m)(c_n - d_n)$, and "m,n" establishes a combinational significance for each of the tertiary partial products.

The sum of a specific secondary partial product with a specific tertiary partial product having the same combinational significance, is calculated. The sum thus calculated is divided by two to provide an interim result. The primary partial product having the same combinational significance as the combinational significances of the secondary and tertiary partial products used in calculating the interim result is subtracted from that interim result to produce an additive factor. Each addition factor is representable by an expression "$F^{+}_{m,n}$", where $F^{+}_{m,n} = [(P2_{m,n} + P3_{m,n}) \div 2] - P1_{m,n}$.

The difference of a secondary partial product less a tertiary partial product having the same combinational significance, is calculated to yield an interim difference. The interim difference is divided by two to produce a subtractive factor. Each subtractive factor is representable by an expression "$F_{m,n}$", where $F_{m,n} = (P2_{m,n} - P3_{m,n}) \div 2$.

The primary partial products, the subtractive factors, and the additive factors are accumulated in a register having an array of register cells to yield an accumulated value in appropriate of the register cells. The register cells are arrayed hierarchically from a first register cell to a (4j−1) register cell, where "j" represents the number of first segment-pairs. The first register cell has the lowest significance in the hierarchical arrangement, and each of the plurality of register cells is representable by $r_x$, where "x" indicates the significance of a respective register cell. The accumulation of the plurality of primary partial products in a respective register cell is effected according to the relationship:

$$P1_{m,n} = b_m d_n \text{—[accumulates in]} \rightarrow r_{2(m+n)-3}.$$

The accumulation of subtractive factors in a respective register cell is effected according to the relationship:

$$F^-_{m,n} \text{—[accumulates in]} \rightarrow r_{2(m+n)2}.$$

The accumulation of the additive factors in a respective register cell is effected according to the relationship:

$$F^+_{m,n} \rightarrow \text{[accumulates in]} \rightarrow r_{2(m+n)-1}.$$

There is then effected a shifting accumulation operation from a lesser-significant register cell within the array of register cells to a next-higher-significance cell within the array of register cells. The shifting accumulation operation begins with the least-significant register cell and comprises shifting specific digits in the accumulated value in the lesser-significance register cell to the next-higher-significance register cell and summing the shifted digits of the higher significance as least-significant digits with the accumulated value in the next-higher-significance register cell. The specific digits to be shifted comprise all digits having higher significance than the number of least-significant digits in the accumulated value in the lesser-significance register cell equal to the number of digits in each of the first segments into which the first number is divided. The shifting accumulation operation continues from the least-significant cell and is effected sequentially between significance-adjacent register cells until the next-higher-significance register cell is the (4j−1) cell, that is, the highest-significance cell having an accumulated value stored therein. The number which is stored within the array of register cells after completion of the shifting accumulation operation described above comprises the product of the first number and second number, and may be shifted out of the array of register cells for use in further processing as appropriate in the apparatus employing the method of the present invention. The method of the present invention may be illustrated by example:

EXAMPLE I

To multiply 256×256:

(1) Segregate the multiplicand and the multiplier into segment-pairs as follows:

```
   25 | 6      Let a = 25    c = 25
   25 | 6          b = 6     d = 6
   -------
   65,5 | 36
```

(2) Determine additive compressions and subtractive compressions as follows:

| (a + b) = 31 | (a − b) = 19 |
|---|---|
| (c + d) = 31 | (c − d) = 19 |

(3) Determine a primary partial product (P1) as follows:

$$bd = 36$$

(4) Determine an additive factor (F$^+$) and a subtractive factor (F$^-$) as follows:

(a + b) (c + d) = 31 × 31 = 961 [Secondary Partial Product]
(a − b) (c − d) = 19 × 19 = 361 [Tertiary Partial Product]
(a + b) (c + d) = ac + bc + ad + bd = 961 = P2
(a − b) (c − d) = ac − bc − ad + bd = 361 = P3
P2 + P3 = [(a + b) (c + d)] + [(a − b) (c − d)]
P2 + P3 = 2ac + 2bd = 1322
ac + bd = 661
ac = 661 − bd
ac = 661 − 36 = 625 = F$^+$
P2 − P3 = [(a + b) (c + d)] − [(a − b) (c − d)]
P2 − P3 = 2bc + 2ad = 600
bc + ad = 300 = F$^-$ (5) Accumulation of the determined terms in a plurality of register cells, hierarchically arranged according to significance, is determined as follows:

(a) Generally, according to generally accepted methods of manual multiplication:

```
        a  b
     ×  c  d
       ad bd
      ac bc
    [ac] + [ad + bc] + [bd]
```

(b) Thus, the array of register cells is set up for accumulating values as follows:

| r3 | r2 | r1 |
|---|---|---|
| ac | ad + bc | bd |

(6) The next step is to effect a shifting accumulating operation, shifting specific digits from a lesser-significant register cell's accumulated value to the next-higher significance register cell, and adding those shifted specific digits to the accumulated value in the next-higher-significance register cell as least-significant digits. The shifted specific digits are all those digits having higher significance than the number of digits in "b", "b" and "d" are required to have an equal number of digits.

| ac | ad + bc | bd |
|---|---|---|
| 625 | 300 | 36 |
| 30 | 3 | |
| 655 | 303 | |

| 655 | 3 | 6 |

(7) The contents of the register contain the correct answer (65,536), and are available for further processing by shifting the contents from the array of register cells, either serially or in parallel, as appropriate.

The method gives correct results regardless of how the multiplicand and multiplier are segregated, so long as "a" and "c" have an equal number of digits (blanks are treated as zeroes), and so long as "b" and "d" have an equal number of digits:

EXAMPLE II (1) Segregate the multiplicand and the multiplier as follows:

$$\begin{array}{r} 1000 | 0 \\ \times \ 2 | 5 \end{array} \quad \text{Let } a = 1000 \quad c = 2 \\ \phantom{\times \ 2 | 5 \quad} b = 0 \quad d = 5$$

(2) Determine additive compressions and subtractive compressions as follows:
  $(a + b) = 1000 \qquad (a - b) = 1000$
  $(c + d) = 7 \qquad (c - d) = -3$ (3) Determine a primary partial product (P1) as follows:
  $bd = 0$ (4) Determine an additive factor (F$^+$) and a subtractive factor (F$^-$) as follows:
  $(a + b)(c + d) = ac + bc + ad + bd = 7000 = P2$
  $(a - b)(c - d) = ac - bc - ad + bd = -3000 = P3$
  $P2 + P3 = [(a + b)(c + d)] + [(a - b)(c - d)]$
  $P2 + P3 = 2ac + 2bd = 4000$
  $\qquad ac + bd = 2000$
  $\qquad ac = 2000 - bd$
  $\qquad ac = 2000 - 0 = 2000 = F^+$
  $P2 - P3 = [(a + b)(c + d)] - [(a - b)(c - d)]$
  $P2 - P3 = 2bc + 2ad = 10000$
  $\qquad bc + ad = 5000 = F^-$ (5) Accumulation of the determined terms in a plurality of register cells, hierarchically arranged according to significance, is determined as follows:

(a) Generally, according to generally accepted methods of manual multiplication:

$$\begin{array}{r} a \ b \\ \times \ c \ d \\ \hline ad \ bd \\ ac \ bc \phantom{d} \\ \hline \end{array}$$
$[ac] + [ad + bc] + [bd]$ (b) Thus, the array of register cells is set up for accumulating values as follows:

| r3 | r2 | r1 |
|---|---|---|
| ac | ad + bc | bd |

(6) The next step is to effect a shifting accumulating operation, shifting specific digits from a lesser-significant register cell's accumulated value to the next-higher significance register cell, and adding those shifted specific digits to the accumulated value in the next-higher-significance register cell as least-significant digits. The shifted specific digits are all those digits having higher significance than the number of digits in "b", "b" and "d" are required to have an equal number of digits.

| ac | bc + ad | bd |
|---|---|---|
| 2000 | 5000 | 0 |
| 500 | | |
| 2500 | 0 | 0 |
| | | |
| 2500 | 0 | 0 |

(7) The contents of the register contain the correct answer (250,000), and are available for further processing by shifting the contents from the array of register cells, either serially or in parallel, as appropriate.

The method accommodates larger numbers as well:

EXAMPLE III

To multiply $1,234 \times 5,678$:

(1) Segregate the multiplicand and the multiplier as follows:

$$\begin{array}{r} 1,234 \\ \times \ 5,678 \\ \hline 9,872 \\ 8,638 \\ 7,404 \\ 6,170 \\ \hline 7,006,652 \end{array} \quad \text{Let } a = 12 \quad c = 56 \\ \phantom{\times \ 5,678 \quad} b = 34 \quad d = 78$$

(2) Determine additive compressions and subtractive compressions as follows:
  $(a + b) = 46 \qquad (a - b) = -22$
  $(c + d) = 134 \qquad (c - d) = -22$ (3) Determine a primary partial product (P1) as follows:
  $bd = 2652$ (4) Determine an additive factor (F$^+$) and a subtractive factor (F$^-$) as follows:
  $(a + b)(c + d) = ac + bc + ad + bd = 6164 = P2$
  $(a - b)(c - d) = ac - bc - ad + bd = 484 = P3$
  $P2 + P3 = [(a + b)(c + d)] + [(a - b)(c - d)]$
  $P2 + P3 = 2ac + 2bd = 6648$
  $\qquad ac + bd = 3324$
  $\qquad ac = 3324 - bd$
  $\qquad ac = 3324 - 2652 = 672 = F^+$
  $P2 - P3 = [(a + b)(c + d)] - [(a - b)(c - d)]$
  $P2 - P3 = 2bc + 2ad = 5680$
  $\qquad bc + ad = 2840 = F^-$ (5) Accumulation of the determined terms in a plurality of register cells, hierarchically arranged according to significance, is determined as follows:

(a) Generally, according to generally accepted methods of manual multiplication:

$$\begin{array}{r} a \ b \\ \times \ c \ d \\ \hline ad \ bd \\ ac \ bc \phantom{d} \\ \hline \end{array}$$
$[ac] + [ad + bc] + [bd]$ (b) Thus, the array of register cells is set up for accumulating values as follows:

| r3 | r2 | r1 |
|---|---|---|
| ac | ad + bc | bd |

(6) The next step is to effect a shifting accumulating operation, shifting specific digits from a lesser-significant register cell's accumulated value to the next-higher significance register cell, and adding those shifted specific digits to the accumulated value in the next-higher-significance register cell as least-significant digits. The shifted specific digits are all those digits having higher significance than the number of digits in "b", "b" and "d" are required to have an equal number of digits.

| ac | bc + ad | bd |
|---|---|---|
| 672 | 2840 | 2652 |
| 28 | 26 | |
| 700 | 2866 | |
| | | |
| 700 | 66 | 52 |

(7) The contents of the register contain the correct answer (7,006,652), and are available for further processing by shifting the contents from the array of register cells, either serially or in parallel, as appropriate.

The method operates for numbers other than base 10 numbers. For example, to multiply $135 \times 214$ (Base 7 Numbers):

EXAMPLE IV

(Base 7 Numbers)

(1) Segregate the multiplicand and the multiplier as follows:

```
    7²  7¹  7⁰     Let a = 13    c = 21
    .   .   .         b = 5      d = 4
    .   .   .
    .   .   .
    1   3   5
    2   1   4
    6   0   6
1   3   5
3   0   3
─────────────
3   2   5   5   6
```

(2) Determine additive compressions and subtractive compressions as follows:

| (a + b) = 21 | (a − b) = 5 |
|---|---|
| (c + d) = 25 | (c − d) = 14 |

(3) Determine a primary partial product (P1) as follows:

$$bd = 26$$

(4) Determine an additive factor ($F^+$) and a subtractive factor ($F^-$) as follows:

$$(a + b)(c + d) = ac + bc + ad + bd = 555 = P2$$
$$(a - b)(c - d) = ac - bc - ad + bd = 106 = P3$$
$$P2 + P3 = [(a + b)(c + d)] + [(a - b)(c - d)]$$
$$P2 + P3 = 2ac + 2bd = 664$$
$$ac + bd = 332$$
$$ac = 332 - bd$$
$$ac = 332 - 26 = 303 = F^+$$
$$P2 - P3 = [(a + b)(c + d)] - [(a - b)(c - d)]$$
$$P2 - P3 = 2bc + 2ad = 446$$
$$bc + ad = 223 = F^-$$

(5) Accumulation of the determined terms in a plurality of register cells, hierarchically arranged according to significance, is determined as follows:

(a) Generally, according to generally accepted methods of manual multiplication:

```
       a   b
    ×  c   d
    ───────
      ad  bd
   ac  bc
   ──────────
   [ac] + [ad + bc] + [bd]
```

(b) Thus, the array of register cells is set up for accumulating values as follows:

| $r_3$ | $r_2$ | $r_1$ |
|---|---|---|
| ac | ad + bc | bd |

(6) The next step is to effect a shifting accumulating operation, shifting specific digits from a lesser-significant register cell's accumulated value to the next-higher significance register cell, and adding those shifted specific digits to the accumulated value in the next-higher-significance register cell as least-significant digits. The shifted specific digits are all those digits having higher significance than the number of digits in "b", "b" and "d" are required to have an equal number of digits.

| ac | bc + ad | bd |
|---|---|---|
| 303 | 223 | 26 |
| 22 | 2 | |
| 325 | 225 | |

```
325        5   6
```

(7) The contents of the register contain the correct answer (32,556), and are available for further processing by shifting the contents from the array of register cells, either serially or in parallel, as appropriate.

The method can be extended to more fully segregate the multiplicand and the multiplier to further distribute the multiplication operation and thereby employ even smaller multipliers in distributive processing:

EXAMPLE V (1) Segregate the multiplicand and the multiplier as follows:

```
    1,234      Let a₁ = 3     a₂ = 1
  × 5,678          b₁ = 4     b₂ = 2
  ────────         c₁ = 7     c₂ = 5
    9,872          d₁ = 8     d₂ = 6
    8,638
    7,404
    6,170
  ────────
  7,006,652
```

(2) Determine additive compressions and subtractive compressions as follows:

Then:
$$(a_1 + b_1) = 7 \quad (a_2 + b_2) = 3 \quad [1]$$
$$(c_1 + d_1) = 15 \quad (c_2 + d_2) = 11$$
$$(a_1 - b_1) = -1 \quad (a_2 - b_2) = -1$$
$$(c_1 - d_1) = -1 \quad (c_2 - d_2) = -1$$

(3) Determine primary partial products ($P1_{m, n}$) as follows:
$$P1_{1, 1} = b_1 d_1 = 32 \quad P1_{2, 1} = b_2 d_1 = 16 \quad [2]$$
$$P1_{1, 2} = b_1 d_2 = 24 \quad P1_{2, 2} = b_2 d_2 = 12$$

(4) Determine additive factors ($F_{m, n}^+$) and subtractive factors ($F_{m, n}^-$) as follows:

(a) $(a_1 + b_1)(c_1 + d_1) = a_1 c_1 + b_1 c_1 + a_1 d_1 + b_1 + d_1 = 105 = P2_{1, 1}$
$(a_1 - b_1)(c_1 - d_1) = a_1 c_1 - b_1 c_1 - a_1 d_1 + b_1 + d_1 = +1 = P3_{1, 1}$
$P2_{1, 1} + P3_{1, 1} = [(a_1 + b_1)(c_1 + d_1)] + (a_1 - b_1)(c_1 - d_1)]$
$P2_{1, 1} + P3_{1, 1} = 2a_1 c_1 + 2b_1 d_1 = 106$
$a_1 c_1 + b_1 d_1 = 53$
$a_1 c_1 = 53 - b_1 d_1$

-continued $$a_0c_1 = 53 - 32 = 21 = F_{1,1}{}^+$$
$$P2_{1,1} - P3_{1,1} = [(a_1 + b_1)(c_1 + d_1)] - [(a_1 - b_1)(c_1 - d_1)]$$
$$P2_{1,1} - P3_{1,1} = 2b_1c_1 + 2a_1d_1 = 104$$
$$b_1c_1 + a_1d_1 = 52 = F_{1,1}{}^- \quad [4]$$

(b) $(a_1 + b_1)(c_2 + d_2) = a_1c_2 + b_1c_2 + a_1d_2 + b_1 + d_2 = 77 = P2_{1,2}$
$(a_1 - b_1)(c_2 - d_2) = a_1c_2 - b_1c_2 - a_1d_2 + b_1 + d_2 = +1 = P3_{1,2}$
$$P2_{1,2} + P3_{1,2} = [(a_1 + b_1)(c_2 + d_2)] + (a_1 - b_1)(c_2 - d_2)]$$
$$P2_{1,2} + P3_{1,2} = 2a_1c_2 + 2b_1d_2 = 78$$
$$a_1c_2 + b_1d_2 = 39$$
$$a_1c_2 = 39 - b_1d_2$$
$$a_1c_2 = 39 - 24 = 15 = F_{1,2}{}^+$$
$$P2_{1,2} - P3_{1,2} = [(a_1 + b_1)(c_2 + d_2)] - (a_1 - b_1)(c_2 - d_2)]$$
$$P2_{1,2} - P3_{1,2} = 2b_1c_2 + 2a_1d_2 = 76$$
$$b_1c_2 + a_1d_2 = 38 = F_{1,2}{}^-$$

(c) $(a_2 + b_2)(c_1 + d_1) = a_2c_1 + b_2c_1 + a_2d_1 + b_2 + d_1 = 45 = P2_{2,1}$
$(a_2 - b_2)(c_1 - d_1) = a_2c_1 - b_2c_1 - a_2d_1 + b_2 + d_1 = +1 = P3_{2,1}$
$$P2_{2,1} + P3_{2,1} = [(a_2 + b_2)(c_1 + d_1)] + [(a_2 - b_2)(c_1 - d_1)]$$
$$P2_{2,1} + P3_{2,1} = 2a_2c_1 + 2b_2d_1 = 46$$
$$a_2c_1 + b_2d_1 = 23$$
$$a_2c_1 = 23 - b_2d_1$$
$$a_2c_1 = 23 - 16 = 7 = F_{2,1}{}^+$$
$$P2_{2,1} - P3_{2,1} = [(a_2 + b_2)(c_1 + d_1)] - (a_2 - b_2)(c_1 - d_1)]$$
$$P2_{2,1} - P3_{2,1} = 2b_2c_1 + 2a_2d_1 = 44$$
$$b_2c_1 + a_2d_1 = 22 = F_{2,1}{}^-$$

(d) $(a_2 + b_2)(c_2 + d_2) = a_2c_2 + b_2c_2 + a_2d_2 + b_2 + d_2 = 33 = P2_{2,2}$
$(a_2 - b_2)(c_2 - d_2) = a_2c_2 - b_2c_2 - a_2d_2 + b_2 + d_2 = +1 = P3_{2,2}$
$$P2_{2,2} + P3_{2,2} = [(a_2 + b_2)(c_2 + d_2)] + (a_2 - b_2)(c_2 - d_2)]$$
$$P2_{2,2} + P3_{2,2} = 2a_2c_2 + 2b_2d_2 = 34$$
$$a_2c_2 + b_2d_2 = 17$$
$$a_2c_2 = 17 - b_2d_2$$
$$a_2c_2 = 17 - 12 = 5 = F_{2,2}{}^+$$
$$P2_{2,2} - P3_{2,2} = [(a_2 + b_2)(c_2 + d_2)] - [(a_2 - b_2)(c_2 - d_2)]$$
$$P2_{2,2} + P3_{2,2} = 2b_2c_2 + 2a_2d_2 = 32$$
$$b_2c_2 + a_2d_2 = 16 = F_{2,2}{}^-$$

(5) Accumulation of the determined terms in a plurality of register cells, hierarchically arranged according to significance, is determined as follows:
(a) Generally, according to generally accepted methods of manual multiplication:

| | | | $a_2$ | $b_2$ | $a_1$ | $b_1$ |
|---|---|---|---|---|---|---|
| | | × | $c_2$ | $d_2$ | $c_1$ | $d_1$ |
| | | | $d_1a_2$ | $d_1b_2$ | $d_1a_2$ | $b_1d_2$ |
| | | $c_1a_2$ | $c_1b_2$ | $c_1a_2$ | $c_1b_1$ | |
| | $d_2b_2$ | $d_2b_2$ | $d_2a_1$ | $d_2b_1$ | | |
| $c_2a_2$ | $c_2b_2$ | $c_2a_1$ | $c_2b_1$ | | | |
| $a_2c_2 +$ | $[a_2d_2 + b_2c_2] +$ | $[a_2c_1 + b_2d_2 + a_1c_2] +$ | $[a_2d_1b_2c_1 + a_1d_2 + b_1c_2] +$ | $[b_2d_1 + a_1c_1 + b_1d_2] +$ | $[a_1d_2 + b_1c_1] +$ | $+ b_1d_1$ |

(b) Thus, the array of register cells is set up for accumulating values as follows:

| $r_7$ | $r_6$ | $r_5$ | $r_4$ | $r_3$ | $r_2$ | $r_1$ |
|---|---|---|---|---|---|---|
| $a_2c_2 +$ | $[a_2d_2 + b_2c_2] +$ | $[a_2c_1 + b_2d_2 + a_1c_2] +$ | $[a_2d_1b_2c_1 + a_1d_2 + b_1c_2] +$ | $[b_2d_1 + a_1c_1 + b_1d_2] +$ | $[a_1d_2 + b_1c_1] +$ | $+ b_1d_1$ |

(6) The next step is to effect a shifting accumulating operation, shifting specific digits from a lesser-significant register cell's accumulated value to the next-higher significance register cell, and adding those shifted specific digits to the accumulated value in the next-higher-significance register cell as least-significant digits. The shifted specific digits are all those digits having higher significance than the number of digits in "$b_m$", "$b_m$" and "$d_n$" are required to have an equal number of digits.

| 5 | 16 | 7 | 12 | 15 | 22 | | 38 | 16 | 21 | 24 | 52 | 32 |
|---|---|---|---|---|---|---|---|---|---|---|---|---|
| | | COMBINE TERM FACTORS AND EFFECT SHIFTING ACCUMULATION | | | | | | | | | | |
| 5 | | 16 | | 34 | | 60 | | 61 | | | 52 | 32 |
| 2 | | 4 | | 6 | | 6 | | 5 | | | 3 | |
| 7 | | 20 | | 40 | | 66 | | 66 | | | 55 | |

-continued

| . | . | . | . | . | . | . |
|---|---|---|---|---|---|---|
| . | . | . | . | . | . | . |
| 7 | 0 | 0 | 6 | 6 | 5 | 2 |

(7) The contents of the register contain the correct answer (7,006,652), and are available for further processing by shifting the contents from the array of register cells, either serially or in parallel, as appropriate.

Inspection of the generally accepted manual method of multiplication reveals a simplified approach to the above-described method of the present invention and gives rise to an alternate embodiment of that method.

Specifically, for example, for a 4-digit number, the register set-up is determined as:

| | | | $a_2$ | $b_2$ | $a_1$ | $b_1$ |
|---|---|---|---|---|---|---|
| | | × | $c_2$ | $d_2$ | $c_1$ | $d_1$ |
| | | | $a_2d_1$ | $b_2d_1$ | $a_1d_1$ | $b_1d_1$ |
| | | $a_2c_1$ | $b_2c_1$ | $a_1c_1$ | $b_1c_1$ | |
| | $a_2d_2$ | $b_2d_2$ | $a_1d_2$ | $b_1d_2$ | | |

|  |  |  |  | $a_2$ | $b_2$ | $a_1$ | $b_1$ |
|---|---|---|---|---|---|---|---|
|  |  |  | × | $c_2$ | $d_2$ | $c_1$ | $d_1$ |
|  | $a_2c_2$ | $b_2c_2$ | $a_1c_2$ | $b_1c_2$ |  |  |  |
| Register Cell | $r_7$ | $r_6$ | $r_5$ | $r_4$ | $r_3$ | $r_2$ | $r_1$ |

The "skewed matrix" resulting from such an application of a manual multiplication technique may be written as a square matrix: (4-digit number, n=2)

| $a_2d_1$ | $b_2d_1$ | $a_1d_1$ | $b_1d_1$ |
|---|---|---|---|
| $a_2c_1$ | $b_2c_1$ | $a_1c_1$ | $b_1c_1$ |
| $a_2d_2$ | $b_2d_2$ | $a_1d_2$ | $b_1d_2$ |
| $a_2c_2$ | $b_2c_2$ | $a_1c_2$ | $b_1c_2$ |

The register set-up previously described in connection with the first embodiment of the method of the present invention is found on the diagonals. Note that the Primary Partial Products ($P1_{m,n}$), the Additive Factors ($F^+_{m,n}$), and the Subtractive Factors ($F^-_{m,n}$) are found on diagonals also.

|  |  | ← columns |  | rows ↓ |
|---|---|---|---|---|
| -4- | -3- | -2- | -1- |  |
| $a_2d_1$ | $b_2d_1$ | $a_1d_1$ | $b_1d_1$ | -1- |
| $a_2c_1$ | $b_2c_1$ | $a_1c_1$ | $b_1c_1$ | -2- |
| $a_2d_2$ | $b_2d_2$ | $a_1d_2$ | $b_1d_2$ | -3- |
| $a_2c_2$ | $b_2c_2$ | $a_1c_2$ | $b_1c_2$ | -4- |

That is, a diagonal extending through (Col. 1, Row 1) contains $P1_{1,1}$ ($b_1d_1$); values on this diagonal accumulate in register cell $r_1$.

The diagonal extending from (Col. 2, Row 1) to (Col. 1, Row 2) contains $F_{1,1}$ ($a_1d_1+b_1c_1$); values on this diagonal accumulate in register cell $r_2$.

The diagonal extending from (Col. 3, Row 1) to (Col. 1, Row 3) contains $P1_{2,1}$ ($b_2d_1$); $F^+_{1,1}(a_1c_1)$, and $P1_{1,2}$ ($b_1d_2$); values on this diagonal accumulate in register cell $r_3$.

The diagonal extending from (Col. 4, Row 1) to (Col. 1, Row 4) contains $F^-_{2,1}$ ($a_2d_1+b_2c_1$); and $F^-_{1,2}$ ($a_1d_2+b_1c_2$); values on this diagonal accumulate in register cell $r_4$.

The diagonal extending from (Col. 4, Row 2) to (Col. 2, Row 4) contains $F^+_{2,1}$ ($a_2c_1$), $P1_{2,2}$ ($b_2d_2$), and $F^+_{1,2}$ ($a_1c_2$); values on this diagonal accumulate in register cell $r_5$.

The diagonal extending from (Col. 4, Row 3) to (Col. 3, Row 4) contains $F^-_{2,2}$ ($a_2d_2+b_2c_2$); values on this diagonal accumulate in register cell $r_6$.

A diagonal through (Col. 4, Row 4) contains $F^+_{2,2}$ ($a_2c_2$); values on this diagonal accumulate in register cell $r_7$.

Thus, for example, for a 6-digit number, where n=3, a square matrix may be set-up as follows:

|  |  |  | ← columns |  |  | rows ↓ |
|---|---|---|---|---|---|---|
| -6- | -5- | -4- | -3- | -2- | -1- |  |
| $a_3d_1$ | $b_3d_1$ | $a_2d_1$ | $b_2d_1$ | $a_1d_1$ | $b_1d_1$ | -1- |
| $a_3c_1$ | $b_3c_1$ | $a_2c_1$ | $b_2c_1$ | $a_1c_1$ | $b_1c_1$ | -2- |
| $a_3d_2$ | $b_3d_2$ | $a_2d_2$ | $b_2d_2$ | $a_1d_2$ | $b_1d_2$ | -3- |
| $a_3c_2$ | $b_3c_2$ | $a_2c_2$ | $b_2c_2$ | $a_1c_2$ | $b_1c_2$ | -4- |
| $a_3d_3$ | $b_3d_3$ | $a_2d_3$ | $b_2d_3$ | $a_1d_3$ | $b_1d_3$ | -5- |
| $a_3c_3$ | $b_3c_3$ | $a_2c_3$ | $b_2c_3$ | $a_1c_3$ | $b_1c_3$ | -6- |

Also, for example, for an 8-digit number, where n=4, a square matrix may be set-up as follows:

|  |  |  |  | ← columns |  |  |  | rows ↓ |
|---|---|---|---|---|---|---|---|---|
| -8- | -7- | -6- | -5- | -4- | -3- | -2- | -1- |  |
| $a_4d_1$ | $b_4d_1$ | $a_3d_1$ | $b_3d_1$ | $a_2d_1$ | $b_2d_1$ | $a_1d_1$ | $b_1d_1$ | -1- |
| $a_4c_1$ | $b_4c_1$ | $a_3c_1$ | $b_3c_1$ | $a_2c_1$ | $b_2c_1$ | $a_1c_1$ | $b_1c_1$ | -2- |
| $a_4d_2$ | $b_4d_2$ | $a_3d_2$ | $b_3d_2$ | $a_2d_2$ | $b_2d_2$ | $a_1d_2$ | $b_1d_2$ | -3- |
| $a_4c_2$ | $b_4c_2$ | $a_3c_2$ | $b_3c_2$ | $a_2c_2$ | $b_2c_2$ | $a_1c_2$ | $b_1c_2$ | -4- |
| $a_4d_3$ | $b_4d_3$ | $a_3d_3$ | $b_3d_3$ | $a_2d_3$ | $b_2d_3$ | $a_1d_3$ | $b_1d_3$ | -5- |
| $a_4c_3$ | $b_4c_3$ | $a_3c_3$ | $b_3c_3$ | $a_2c_3$ | $b_2c_3$ | $a_1c_3$ | $b_1c_3$ | -6- |
| $a_4d_4$ | $b_4d_4$ | $a_3d_4$ | $b_3d_4$ | $a_2d_4$ | $b_2d_4$ | $a_1d_4$ | $b_1d_4$ | -7- |
| $a_4c_4$ | $b_4c_4$ | $a_3c_4$ | $b_3c_4$ | $a_2c_4$ | $b_2c_4$ | $a_1c_4$ | $b_1c_4$ | -8- |

The register set-ups may be seen to lie along diagonals, and may be expressed in the following format (cases for n=2, n=3, and n=4 are tabulated for ease of comparison):

|  | $r_{15}$ | $r_{14}$ | $r_{13}$ | $r_{12}$ | $r_{11}$ | $r_{10}$ | $r_9$ | $r_8$ |
|---|---|---|---|---|---|---|---|---|
| n = 2 |  |  |  |  |  |  |  |  |
| n = 3 |  |  |  |  | $F_{3,3}^+$ | $F_{3,3}^-$ | $P1_{3,3}$ | $F_{2,3}^-$ |
|  |  |  |  |  |  |  | $F_{2,3}^+$ | $F_{3,2}^-$ |
|  |  |  |  |  |  |  | $F_{3,2}^+$ |  |
| n = 4 | $F_{4,4}^+$ | $F_{4,4}^-$ | $P1_{4,4}$ | $F_{3,4}^-$ | $P1_{3,4}$ | $F_{2,4}^-$ | $P1_{2,4}$ | $F_{1,4}^-$ |
|  |  |  | $F_{3,4}^+$ | $F_{4,3}^-$ | $P1_{4,3}$ | $F_{3,3}^-$ | $P1_{3,3}$ | $F_{2,3}^-$ |
|  |  |  | $F_{4,3}^+$ |  | $F_{2,4}^+$ | $F_{4,2}^-$ | $P1_{4,2}$ | $F_{3,2}^-$ |
|  |  |  |  |  | $F_{3,3}^+$ |  | $F_{1,4}^+$ | $F_{4,1}^-$ |
|  |  |  |  |  | $F_{4,2}^+$ |  | $F_{2,3}^+$ |  |
|  |  |  |  |  |  |  | $F_{3,2}^+$ |  |
|  |  |  |  |  |  |  | $F_{4,1}^+$ |  |

|  | $r_7$ | $r_6$ | $r_5$ | $r_4$ | $r_3$ | $r_2$ | $r_1$ |
|---|---|---|---|---|---|---|---|
| n = 2 | $F_{2,2}^+$ | $F_{2,2}^-$ | $P1_{2,2}$ | $F_{1,2}^-$ | $P1_{1,2}$ | $F_{1,1}^-$ | $P1_{1,1}$ |
|  |  |  | $F_{1,2}^+$ | $F_{2,1}^-$ | $P1_{2,1}$ |  |  |
|  |  |  | $F_{2,1}^+$ |  | $F_{1,1}^+$ |  |  |
| n = 3 | $P1_{2,3}$ | $F_{1,3}^-$ | $P1_{1,3}$ | $F_{1,2}^-$ | $P1_{1,2}$ | $F_{1,1}^-$ | $P1_{1,1}$ |
|  | $P1_{3,2}$ | $F_{3,1}^-$ | $P1_{2,2}$ | $F_{2,1}^-$ | $P1_{2,1}$ |  |  |
|  | $F_{1,3}^+$ | $F_{2,2}^-$ | $P1_{3,1}$ |  | $F_{1,1}^+$ |  |  |
|  | $F_{3,1}^+$ |  | $F_{1,2}^+$ |  |  |  |  |
|  | $F_{2,2}^+$ |  | $F_{2,1}^+$ |  |  |  |  |
| n = 4 | $P1_{1,4}$ | $F_{1,3}^-$ | $P1_{1,3}$ | $F_{1,2}^-$ | $P1_{1,2}$ | $F_{1,1}^-$ | $P1_{1,1}$ |
|  | $P1_{2,3}$ | $F_{3,1}^-$ | $P1_{2,2}$ | $F_{2,1}^-$ | $P1_{2,1}$ |  |  |
|  | $P1_{3,2}$ | $F_{2,2}^-$ | $P1_{3,1}$ |  | $F_{1,1}^+$ |  |  |
|  | $P1_{4,1}$ |  | $F_{1,2}^+$ |  |  |  |  |
|  | $F_{1,3}^+$ |  | $F_{2,1}^+$ |  |  |  |  |

| | |
|---|---|
| $F_{3,1}{}^+$ | |
| $F_{2,2}{}^+$ | |

By inspection, the register set-up may be recognized as being effected according to the following relationships:

| | |
|---|---|
| Primary Partial Products: | $P1_{m,n}$ —[assigned to]→ $r_{2(m+n)-3}$ |
| Subtractive Factors: | $F_{m,n}{}^-$ —[assigned to]→ $r_{2(m+n)-2}$ |
| Additive Factors: | $F_{m,n}{}^+$ —[assigned to]→ $r_{2(m+n)-1}$ |

A generalized case of a square matrix for determining register set-ups for multiplication of a first number and a second number according to the first embodiment of the method of the present invention is illustrated in FIG. 1. In FIG. 1, Columns numbered 1 through m are shown, indicating increasing significance from right to left, across the top of the square matrix; Rows numbered 1 through n are also shown, indicating increasing significance, from the top to the bottom of the square matrix.

The terms to be accumulated in respective registers $r_x$ are indicated as being found on parallel diagonals. For example, for the case of a number divided into four first segment-pairs and four second segment-pairs (i.e., where m=4 and n=4), a square matrix of eight columns and eight rows will provide the elements to be accumulated in respective registers along its diagonals running from (Col. m, Row 1) to (Col. 1, Row n), where m=n. Only those terms falling within the square 8×8 matrix (delineated by bold line 10 in FIG. 1) along the various diagonals will be accumulated in the appropriate registers. Once accumulation is effected, the shifting accumulation operation previously described in connection with the first embodiment of the method of the present invention is carried out.

Comparing the (column, row) numbers, instead of the subscripts (m,n) indicating combinational significance for the segment-pairs of the multiplicand and multiplier with register numbers, one can, by inspection, observe that the accumulation of terms, or partial products, in register cells is effected according to the diagram illustrated in FIG. 2. Referring to FIG. 2, registers r are listed with the (column, row) location of the partial products to be accumulated in the respective registers tabulated co-linearly with the respective register to the right of the register $r_x$ into which they are accumulated. The sum of the column number and row number of each of the partial products accumulated within a respective register is tabulated co-linearly to the left of the respective register number, $r_x$. Inspection reveals that the (column, row) number sum ($\Sigma m+n$) always equals the register designation, x, increased by one. That is, $m+n=x+1$. Therefore, the register $r_x$ into which a given partial product is to be accumulated may be entirely determined by ascertaining its (column, row) location within an appropriate square matrix.

Accordingly, a simpler, preferred method for determining the product of two numbers according to the present invention does not require segmenting the multiplicand and multiplier into segment-pairs. According to the preferred method of the present invention, a first number (e.g., the multiplicand) has a plurality of first digits hierarchically arranged from a first least-significant place to a first most-significant place, and a second number (e.g., the multiplier) has a plurality of second digits hierarchically arranged from a second least-significant place to a second most-significant place. The preferred method comprises the steps of determining a plurality of partial products (treating blank places of the shorter of the two numbers as zeroes while determining the plurality of partial products), which plurality of partial products comprises a respective partial product for each pair-combination of the first digits and second digits. Each respective partial product thus has a combinational significance which is established by the significance of the first digit of the pair-combination involved in the respective partial product and by the significance of the second digit of the pair-combination involved in the respective partial product. A register is provided for storing information, which register has a plurality of register cells for storing accumulated values, each register cell having a hierarchical significance. Selected partial products are accumulated to produce accumulated values in specified register cells according to the following relationship:

$$P_{m,n}\text{—[accumulates in]}\rightarrow r_x; \quad x=(m+n)-1$$

where "$P_{m,n}$" represents a respective partial product, "m" represents the significance of the first digit of the pair-combination involved in the respective partial product (m=1, 2, 3, . . . ), "n" represents the significance of the second digit of the pair-combination involved in the respective partial product (n=1, 2, 3, . . . ), and "r," represents a specified register cell having a significance "x".

Then a shifting accumulation operation is effected in the register. The shifting accumulation operation comprises shifting specific digits of the accumulated value stored in a lesser-significant register cell to the next-higher-significant register cell of the register cells containing an accumulated value, and adding the specific digits to the accumulated value stored in the next-higher-significant register cell as least-significant digits. The specific digits shifted are those digits of the accumulated value stored in the lesser-significant register cell having higher significance than the least-significant digit of the accumulated value. The shifting accumulation operation is effected sequentially between significance-adjacent register cells from the least-significant register cell to the most-significant register cell containing an accumulated value. The result contained within the array of register cells after completion of the shifting accumulation operation is the product of the multiplicand and multiplier and is available for shifting, serially or in parallel, as required for further processing. The significance of the respective digits of the multiplicand and multiplier directly determine the location of each partial product in a square matrix, and the location in the square matrix determines into which register cell each partial product is accumulated for the shifting accumulation operation.

In fact, with the proper apparatus for practicing this preferred method, no matrix is required. The significances of the first digit and the second digit involved in a respective partial product determine into which register cell the partial product is to be accumulated according to the relationship, $x=(m+n)-1$.

Figure 3:
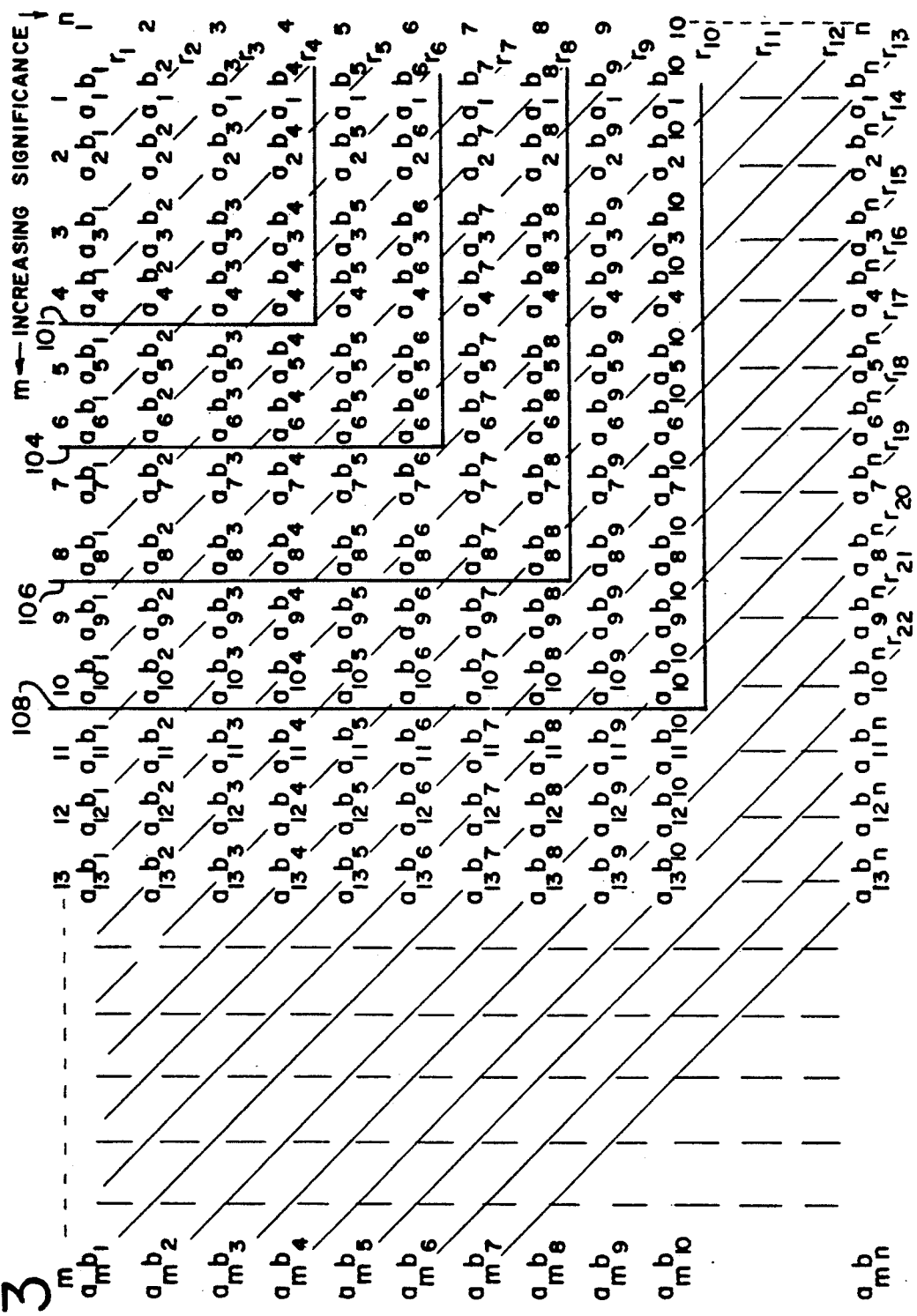
FIG. 3 is a representation of a generalized matrix for determining register set-ups according to the preferred embodiment of the method of the present invention.

FIG. 3 is a representation of a generalized square matrix for determining register set-ups according to the preferred method of the present invention. In FIG. 3, digits of a first number (e.g., the multiplicand) are indicated as $a_m$ ("m" indicates the significance of the first digit; m=1, 2, 3, ...) and digits of a second number (e.g., the multiplier) are indicated as $b_n$ ("n" indicates the significance of the second digit; n=1, 2, 3, ...). By such arrangement, the significances of the respective first digits are directly correlative with the column number of the square matrix of FIG. 3, and the significances of the respective second digits are directly correlative with the row number of the square matrix of FIG. 3. Accordingly, a four-digit number may be represented by the 4×4 square matrix included within bold line 101, and diagonals running from (Col. m, Row 1) to (Col. 1, Row n), where m=n, in the generalized square matrix of FIG. 3 identify partial products within the 4×4 matrix defined by bold line 101 to be accumulated in specified register cells, $r_x$. The matrix illustrated in FIG. 3 is not essential to the practice of the preferred method, but is helpful in illustrating and explaining the practice of the method. That is, placement of partial products within the square matrix of FIG. 3 is entirely dependent upon the combinational significance of the first digit and second digit of the pair-combination involved in a respective partial product; the (column, row) designation (m,n) entirely identifies the respective register cell into which a respective partial product is to be accumulated. Therefore, the combinational significance of a respective partial product entirely identifies the register cell into which the respective partial product is to be accumulated, and no matrix need be employed as an interim step or device for determining the register cell in which a respective partial product is to be accumulated.

In similar fashion, the product of a 6-digit multiplicand and a 6-digit multiplier can be determined by a square matrix defined by bold line 104 in FIG. 3 defining a 6×6 square matrix. The product of an 8-digit multiplicand and an 8-digit multiplier can be determined according to the preferred method of the present invention by a square 8×8 matrix defined by bold line 106 in FIG. 3; the product of a 10-digit multiplicand and a 10-digit multiplier may be determined by the square 10×10 matrix defined by bold line 108 in FIG. 3.

Thus, certain design parameters of a system for multiplying two numbers can be easily ascertained merely by knowing the expected size of multiplicand-multiplier operations to be accommodated by the system. For example, referring again to FIG. 3, the diagonal indicating accumulation of terms in register $r_7$ passes through (column, row) position (4,4); a designer need only know that either the multiplicand or the multiplier will comprise 4 digits. Knowing that, and calculating $\Sigma m+n=x+1$ yields x=7. Thus, merely knowing that four digits will be involved in multiplication enables a designer to determine that he will be required to provide an array of 7 register cells to accommodate the preferred method of the present invention for a 4-digit multiplicand and 4-digit multiplier operation. Also, by determining the size of numbers required for a given multiplicand-multiplier operation, one can determine the number of multipliers required for determining the respective partial products involved in practicing the preferred method of the present invention. That is, for a 4-digit operation (requiring a 4×4 matrix), 16 partial products are calculated. A system designer may choose to provide 16 multipliers, thereby allowing single-clock cycle determination of the 16 partial products required, or a lesser number of multipliers may be provided to enable multi-clock cycle determination of the required 16 partial products. Moreover, since single-digit multiplications only are involved in determining partial products, only 4×4 multipliers are required. Thus, instead of a 256-bit (i.e., 16×16) multiplier for 4-digit multiplication operations, as would be required for a prior art multiplier apparatus, a designer may opt to employ only eight 4×4 multipliers (i.e., only 8×4×4=128 bits of area occupied) and save "real estate".

Still further, control software or hardware may be programmed to power-up only the multipliers and register cells needed for a particular multiplication operation. Thus, for example, a 4×4 system may accommodate a 2-digit multiplication operation and only power-up the necessary multipliers (i.e., only m×n=2×2=4 multipliers are required), and only the necessary register cells need be powered-up (i.e., only (m+n−1=2+2−1=3 register cells are required).

Proper selection of the number of multipliers employed in distributive determination of partial products may actually speed the multiplication operation since numerous lower order multiplication operations to determine partial products occur simultaneously. Thus, if a designer elects to accommodate 4×4 multiplication operation (i.e., to multiply 4-digit numbers) using sixteen 4×4 multipliers (real estate occupancy=16×4×4=256 bits), while no real estate occupancy advantage is realized over the prior art, the multiplication operation will be completed in fewer clock cycles.

Another aspect of the present invention is an apparatus for carrying out the method of the present invention.

Figure 4:
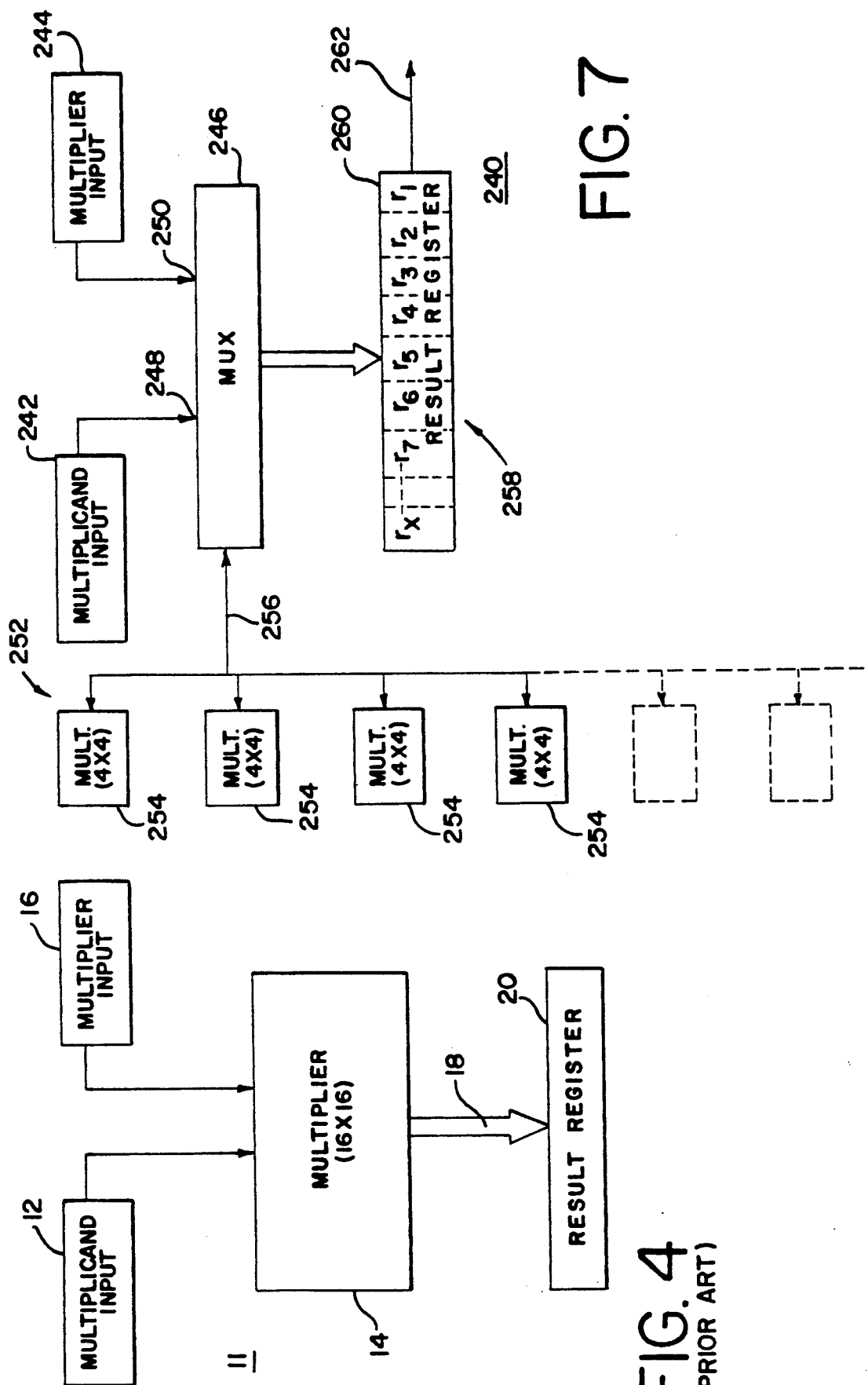
FIG. 4 is a schematic block diagram of a prior art apparatus for determining the product of two numbers.

FIG. 4 is a schematic block diagram of a prior art apparatus for determining the product of two numbers. In FIG. 4, a multiplier apparatus is illustrated comprising a multiplicand input 12 providing a multiplicand to a multiplier unit 14 and a multiplier input 16 providing a multiplier to multiplier unit 14. Multiplier unit 14 produces a result representing the product of the multiplicand and the multiplier via bus 18 to a result register 20. Multiplier unit 14 is large enough to accommodate a predetermined size of multiplicand and multiplier. For example, to accommodate a 4-digit multiplicand and a 4-digit multiplier, multiplier unit 14 must be a 16×16 bit multiplier. That is, in a prior art multiplier apparatus, such as multiplier apparatus 11 of FIG. 4, the multiplier unit 14 comprises 16 1 columns of transistors, each column having 16 rows of transistors, with additional rows, or columns, or both to accommodate carries and other overhead operations involved in multiplication.

Figure 5:
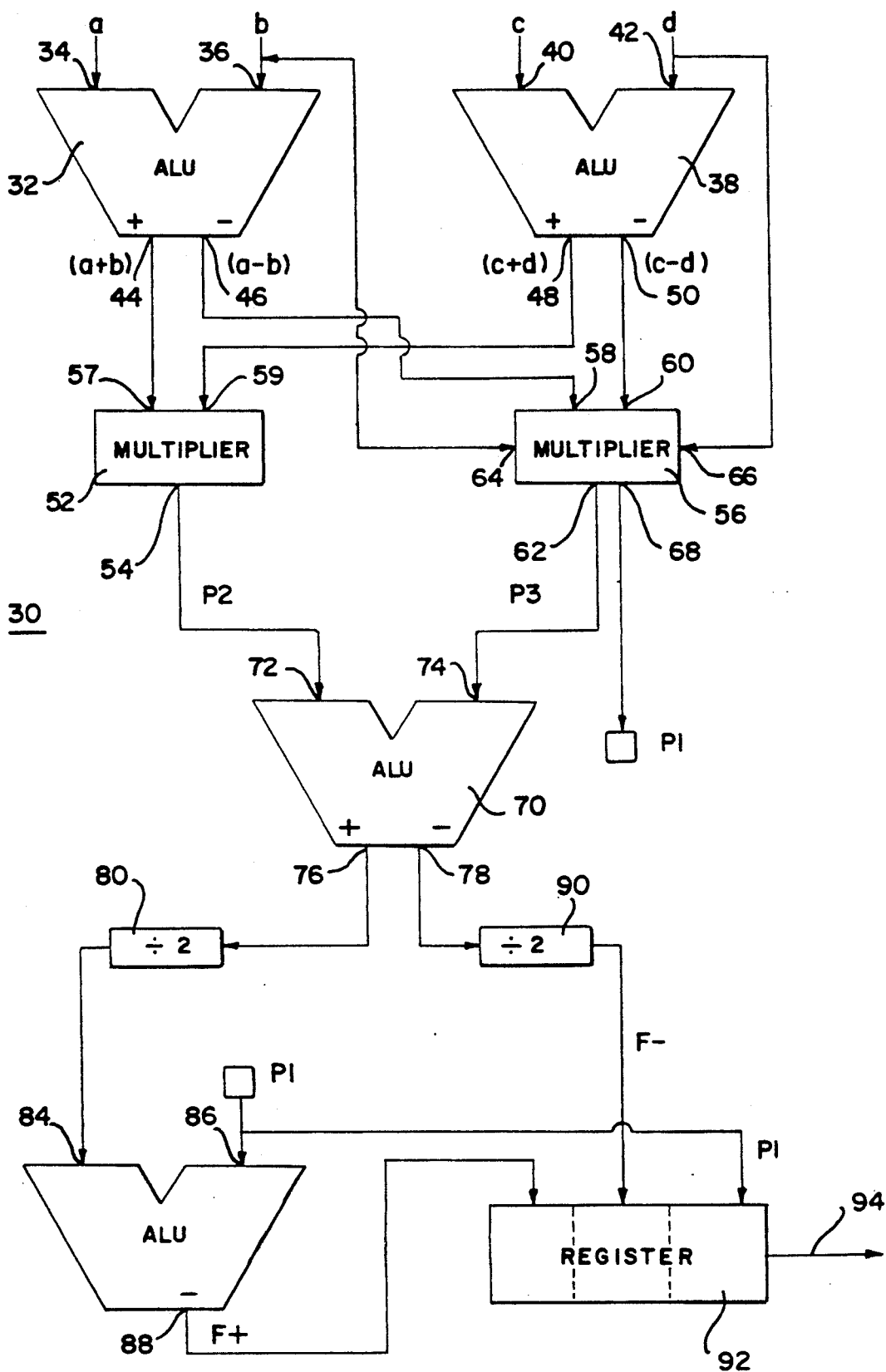
FIG. 5 is a schematic diagram of an apparatus for practicing the first embodiment of the method of the present invention in which the first number is segmented into a single first segment-pair and the second number is segmented into a single second segment-pair.

FIG. 5 is a schematic diagram of an apparatus for practicing the first embodiment of the method of the present invention in which the first number is segmented into a single first segment-pair and the second number is segmented into a single second segment-pair. Such segmentation was illustrated and discussed in connection with Examples I through IV. In FIG. 5, a multiplier apparatus 30 is illustrated comprising an arithmetic logic unit (ALU) 32 receiving higher significance segment "a" of the first segment-pair (a,b) at an input 34 and receiving lower significance segment "b" of the first segment-pair (a,b) at an input 36.

An ALU 38 receives the higher significance segment "c" of second segment-pair (c,d) at an input 40 and receives lower significance segment "d" of second segment-pair (c,d) at an input 42. ALU 32 has a summing output 44 at which is produced the sum (a+b), and a difference output 46 at which is produced the difference (a−b). ALU 38 has a summing output 48 at which is produced the sum (c+d), and a difference output 50 at which is produced the difference (c−d).

A multiplier 52 is connected to receive summing output 44 of ALU 32 at an input 57, and is connected to receive summing output 48 of ALU 38 at an input 59. Multiplier 52 produces a secondary partial product (P2=[a+b][c+d]) at an output 54. A multiplier 56 is connected to receive difference output 46 of ALU 32 at an input 58 is connected to receive difference output 50 of ALU 38 at an input 60. Multiplier 56 produces a tertiary partial product (P3=[a−b][c−d]) at an output 62. Multiplier 56 also receives the quantity "b" from input 36 of ALU 32 at an input 64, and receives the quantity "d" from input 42 of ALU 38 at an input 66. Multiplier produces a primary partial product P1 (P1=bd) at an output 68.

An ALU 70 receives secondary partial product P2 from output 54 of multiplier 52 at an input 72, and receives tertiary partial product P3 from output 62 of multiplier 56 at an input 74. ALU 70 has a summing output 76 and a difference output 78. The sum of secondary partial product P2 and tertiary partial product P3 is produced at summing output 76, is divided by two by a divider 80, and is passed to an ALU 82 at an input 84. ALU 84 also receives primary partial product P1 from output 68 of multiplier 56 at an input 86 and produces at a difference output 88 additive factor F+ (F+=[(P2+P3)÷2]−P1).

The output produced at difference output 78 of ALU 70 is divided by two by a divider 90 to produce subtractive factor F− (F−=[(P2−P3)÷2]). Additive factor F+, subtractive factor F−, and primary partial product P1 are appropriately provided to a register 92 according to the relationships described in connection with the first embodiment of the method of the present invention. Register 92 performs the shifting accumulation operation described in connection with the description of the first embodiment of the method of the present invention to generate the product of the numbers represented by first segment-pair (a,b) and second segment-pair (c,d) at an output 94.

Figure 6:
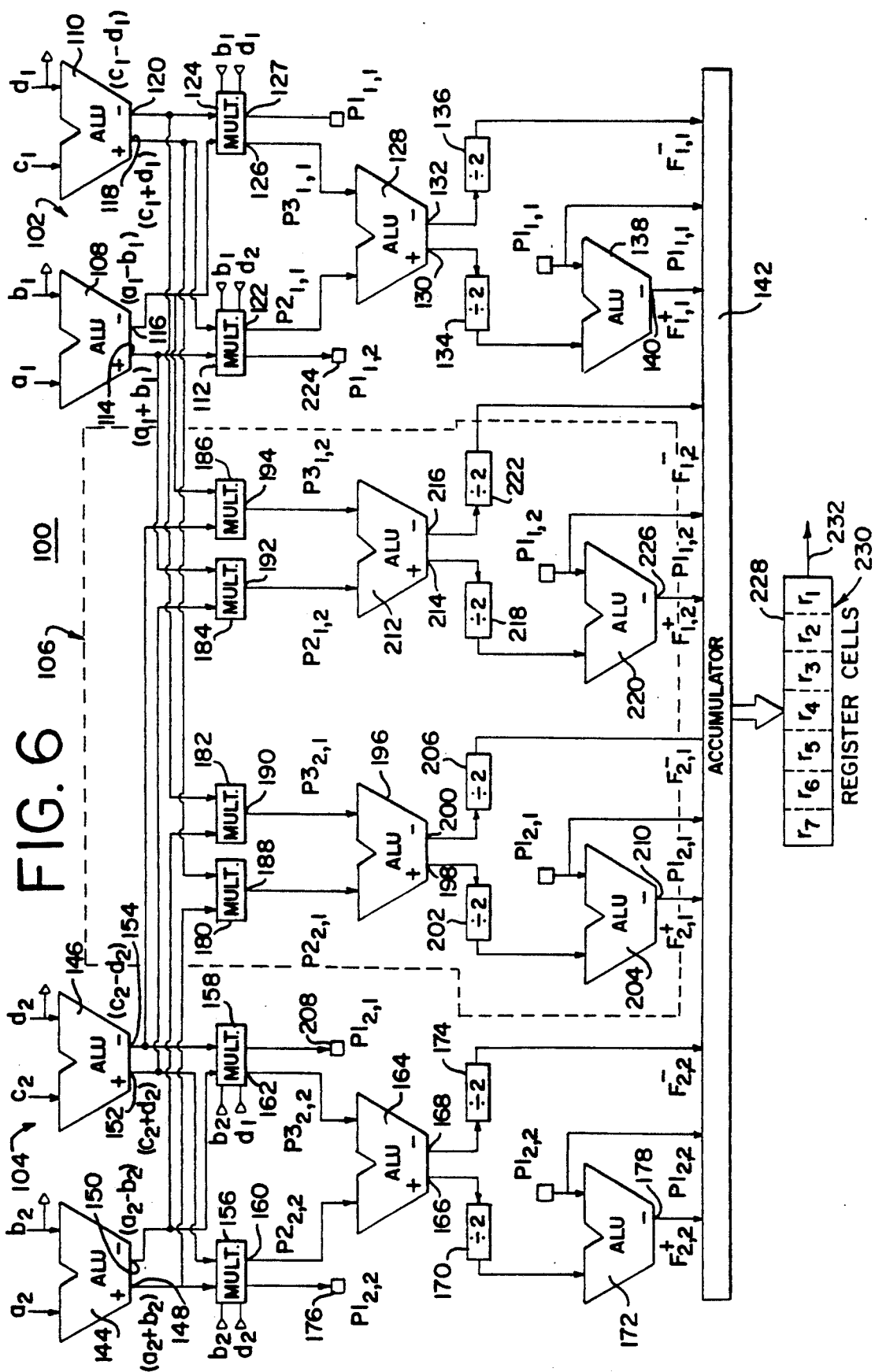
FIG. 6 is a schematic block diagram of an apparatus for practicing the first embodiment of the method of the present invention in which the multiplicand is segregated into first segment-pairs $(a_1,b_1)$ and $(a_2,t_2)$, and the multiplier is segregated into second segment-pairs $(c_1,d_1)$ and $(c_2,d_2)$.

FIG. 6 is a schematic block diagram of an apparatus for practicing the first embodiment of the method of the present invention in which the multiplicand is segregated into first segment-pairs ($a_1,b_1$) and ($a_2,b_2$), and the multiplier is segregated into second segment-pairs ($c_1,d_1$) and ($c_2,d_2$). In FIG. 6, a multiplier apparatus 100 is illustrated comprising a lower significance multiplier subsystem 102, a higher significance multiplier subsystem 104, and a cross-multiplying subsystem 106. Lower significance multiplier subsystem 102 and higher significance multiplier subsystem 104 are each substantially the same as multiplier apparatus 30, illustrated in FIG. 5.

Thus, lower significance multiplier subsystem 102 includes an ALU 108 receiving the higher-significance segment "$a_1$" and the lower-significance segment "$b_1$" of first segment-pair ($a_1,b_1$) as inputs; and an ALU 110 receiving the higher-significance segment "$c_1$" and the lower-significance segment "$d_1$" of second segment-pair ($c_1,d_1$) as inputs.

A multiplier 112 receives inputs from summing output 114 of ALU 108 and summing output 118 of ALU 110 to provide secondary partial product $P2_{1,1}$ ($P2_{1,1}=[a_1+b_1][c_1+d_1]$) at an output 122. A multiplier 124 receives inputs from difference output 116 of ALU 108 and difference output 120 of ALU 110 to provide tertiary partial product $P3_{1,1}$ ($P3_{1,1}=[a_1−b_1][c_1−d_1]$) at an output 126.

An ALU 128 receives secondary partial product $P2_{1,1}$ from output 122 of multiplier 112 and tertiary partial product $P3_{1,1}$ from output 126 of multiplier 124 as inputs. The quantity ($P2_{1,1}+P3_{1,1}$) is provided at summing output 130 of ALU 128, is divided by two by a divider 134, and is provided as an input to an ALU 138. Quantity "$b_1$" and quantity "$d_1$" are provided to multiplier 124 so that multiplier 124 provides primary partial product $P1_{1,1}$ ($P1_{1,1}=b_1d_1$) at an output 127. $P1_{1,1}$ is provided as an input to ALU 138 and is provided for accumulation in an accumulator 142. Difference output 140 of ALU 138 provides additive factor $F^+{}_{1,1}$ ($F^+{}_{1,1}=[(P2_{1,1}+P3_{1,1})÷2]−P1_{1,1}$) for accumulation in accumulator 142. The quantity ($P2_{1,1}−P3_{1,1}$) is provided at difference output 132 of ALU 128 and is divided by two by a divider 136 to provide subtractive factor $F^-{}_{1,1}$ ($F^-{}_{1,1}=[P2_{1,1}−P3_{1,1}]÷2$) for accumulation in accumulator 142.

Higher significance multiplier subsystem 104 includes an ALU 144 receiving higher-significance segment "$a_2$" and lower-significance segment "$b_2$" of first segment-pair ($a_2,b_2$) as inputs. An ALU 146 receives higher-significance segment "$c_2$" and lower-significance segment "$d_2$" of second segment-pair ($c_2,d_2$) as inputs. A multiplier 156 receives inputs from summing output 148 of ALU 144 and summing output 152 of ALU 146. A multiplier 158 receives inputs from difference output 150 of ALU 144 and difference output 154 of ALU 146. Multiplier 156 produces secondary partial product $P2_{2,2}$ ($P2_{2,2}=[a_2+b_2][c_2+d_2]$) at an output 160, and multiplier 158 produces tertiary partial product $P3_{2,2}$ ($P3_{2,2}=[a_2−b_2][c_2−d_2]$) at an output 162.

An ALU 164 receives secondary partial product $P2_{2,2}$ from output 160 of multiplier 156 and tertiary partial product $P3_{2,2}$ from output 162 of multiplier 158 as inputs. The quantity ($P2_{2,2}+P3_{2,2}$) is produced at summing output 166 of ALU 164, is divided by two by a divider 170, and is provided as an input to an ALU 172. The quantity is produced at difference output 168 of ALU 164 and is divided by two by a divider 174 to provide subtractive factor $F^-{}_{2,2}$ ($F^-{}_{2,2}=[P2_{2,2}−P3_{2,2}]÷2$) for accumulation in accumulator 142. Multiplier 156 receives quantity "$b_2$" and quantity "$d_2$" as inputs and produces primary partial product $P1_{2,2}$ ($P1_{2,2}=b_2d_2$) at an output 176. Output 176 is operatively connected to provide primary partial product $P1_{2,2}$ as an input to ALU 172 and to provide $P1_{2,2}$ for accumulation in accumulator 142. Difference output 178 of ALU 172 provides additive factor $F^+{}_{2,2}$ ($F^+{}_{2,2}=[P2_{2,2}+P3_{2,2}]÷2−P1_{2,2}$) for accumulation in accumulator 142.

Cross-multiplying subsystem 106 includes multipliers 180, 182, 184, and 186. Multiplier 180 receives as inputs the quantity ($a_2+b_2$) produced at summing output 148 of ALU 144 and the quantity ($c_1+d_1$) produced at summing output 118 of ALU 110, and produces secondary partial product $P2_{2,1}$ ($P2_{2,1}=[a_2+b_2][c_1+d_1]$) at an output 188. Multiplier 182 receives as inputs the quantity ($a_2−b_2$) produced at difference output 150 of ALU 144 and the quantity ($c_1−d_1$) produced at difference output 120 of ALU 110, and produces tertiary partial product $P3_{2,1}$ ($P3_{2,1}=[a_2−b_1][c_2−d_2]$) at an output 190. Multiplier 184 receives as inputs the quantity ($c_2−d_1$)

produced at summing output 152 of ALU 146 and the quantity $(a_1+b_1)$ produced at summing output 114 of ALU 108, and produces secondary partial product $P2_{1,2}$ ($P2_{1,2}=[a_1+b_1][c_2+d_2]$) at an output 192. Multiplier 186 receives as inputs the quantity $(c_2-d_1)$ produced at difference output 154 of ALU 146 and the quantity $(a_2-b_1)$ produced at difference output 116 of ALU 108, and produces tertiary partial product $P3_{1,2}$ ($P3_{1,2}=[a_1-b_1][c_2-d_2]$) at an output 194.

An ALU 196 receives secondary partial product $P2_{2,1}$ from output 188 of multiplier 180 and tertiary partial product $P3_{2,1}$ from output 190 of multiplier 182. The quantity $(P2_{2,1}+P3_{2,1})$ produced at summing output 198 of ALU 196 is divided by two by a divider 202 and provided as an input to an ALU 204. The quantity $(P2_{2,1}-P3_{2,1})$ produced at difference output 200 of ALU 196 is divided by two by a divider 206 to produce subtractive factor $F^-_{2,1}$ ($F^-_{2,1}=[P2_{2,1}-P3_{2,1}]\div 2$) for accumulation in accumulator 142.

Multiplier 158 receives as additional inputs the quantity "$b_2$" and the quantity "d" and produces primary partial product $P1_{2,1}$ ($P1_{2,1}=b_2 d_1$) at an output 208. Output 208 is operatively connected to provide primary partial product $P1_{2,1}$ as an input to ALU 204 and to provide $P1_{2,1}$ for accumulation in accumulator 142. ALU 204 provides at its difference output 210 additive factor F ($F^+_{2,1}=[P2_{2,1}+P3_{2,1}]\div 2 - P1_{1,1}$) for accumulation in accumulator 142.

An ALU 212 receives secondary partial product $P2_{1,2}$ ($P2_{2,1}=[a_1+b_1][c_2+d_2]$) from output 192 of multiplier 184 and receives tertiary partial product $P3_{1,2}$ ($P3_{1,2}=[a_1-b_1][c_2-d_2]$) from output 194 of multiplier 186 as inputs. ALU 212 provides at its summing output 214 a quantity $(P2_{1,2}+P3_{1,2})$ which is divided by two by a divider 218 and provided as an input to an ALU 220. ALU 212 also provides at its difference output 216 a quantity $(P2_{1,2}-P3_{1,2})$ which is divided by two by a divider 222 to produce subtractive factor $F^-_{1,2}$ ($F^-_{1,2}=[P2_{1,2}-P3_{1,2}]\div 2$) for accumulation in accumulator 142.

Multiplier 112 receives as inputs the quantities "$b_1$" and "$d_2$" and produces primary partial product $P1_{1,2}$ ($P1_{1,2}=b_1 d_2$) at an output 224. Output 224 is operatively connected to provide primary partial product $P1_{1,2}$ as an input to ALU 220 and to provide $P1_{1,2}$ for accumulation in accumulator 142. ALU 220 produces at its difference output 226 additive factor $F^+_{1,2}$ ($F^+_{1,2}=[P2_{1,2}+P3_{1,2}]\div 2 - P1_{1,2}$) for accumulation in accumulator 142.

Accumulator 142 accumulates the various primary partial products $P1_{m,n}$, additive factors $F^+_{m,n}$, and subtractive factors $F^-_{m,n}$ for storage in an array of register cells 230 within a register 228. Register 228 performs a shifting accumulation operation as described in connection with the description of the first embodiment of the method of the present invention and the number residing within register 228 after completion of the shifting accumulation operation is the product of the first number comprising first segment-pairs $(a_1,b_1)$ and $(a_2,b_2)$ and the second number comprising second segment-pairs $(c_1,d_1)$ and $(c_2,d_2)$. That product is available for shifting, either serially or in parallel as appropriate, via an output 232.

FIG. 7 is a schematic block diagram of an apparatus for carrying out the preferred embodiment of the method of the present invention. In FIG. 7, a multiplying apparatus 240 receives a multiplicand from a multiplicand input 242 and receives a multiplier from a multiplier input 244. The multiplicand is received by a multiplexer 246 at an input 248 and the multiplier is received at an input 250 of multiplexer 246.

An array 252 of multipliers 254 is operatively connected by a bus 256 with multiplexer 246. Multiplexer 246 is programmed to recognize the significances of the respective digits of the multiplicand and the multiplier received at inputs 248, 250 so that, after routing respective pair-combinations of multiplicand digits and multiplier digits to available multipliers 254 for multiplication to produce a respective partial product for each such pair-combination, and after receiving the respective partial products from the array 252 of multipliers 254 via bus 256, multiplexer 246 directs accumulation of respective partial products in appropriate register cells 258 in result register 260 according to the significance of the multiplicand digit and the significance of the multiplier digit of the pair-combination involved in each respective partial product.

Result register 260 effects a shifting accumulation operation as described in connection with the preferred embodiment of the method of the present invention and, after completion of the shifting accumulation operation, the number residing in the array of register cells 258 is the product of the multiplicand and multiplier inputs received at inputs 248, 250 of multiplexer 246. That result is available for shifting through an output 262, either serially or in parallel as appropriate, for use or further processing by a system employing multiplying apparatus 240.

Figure 8:
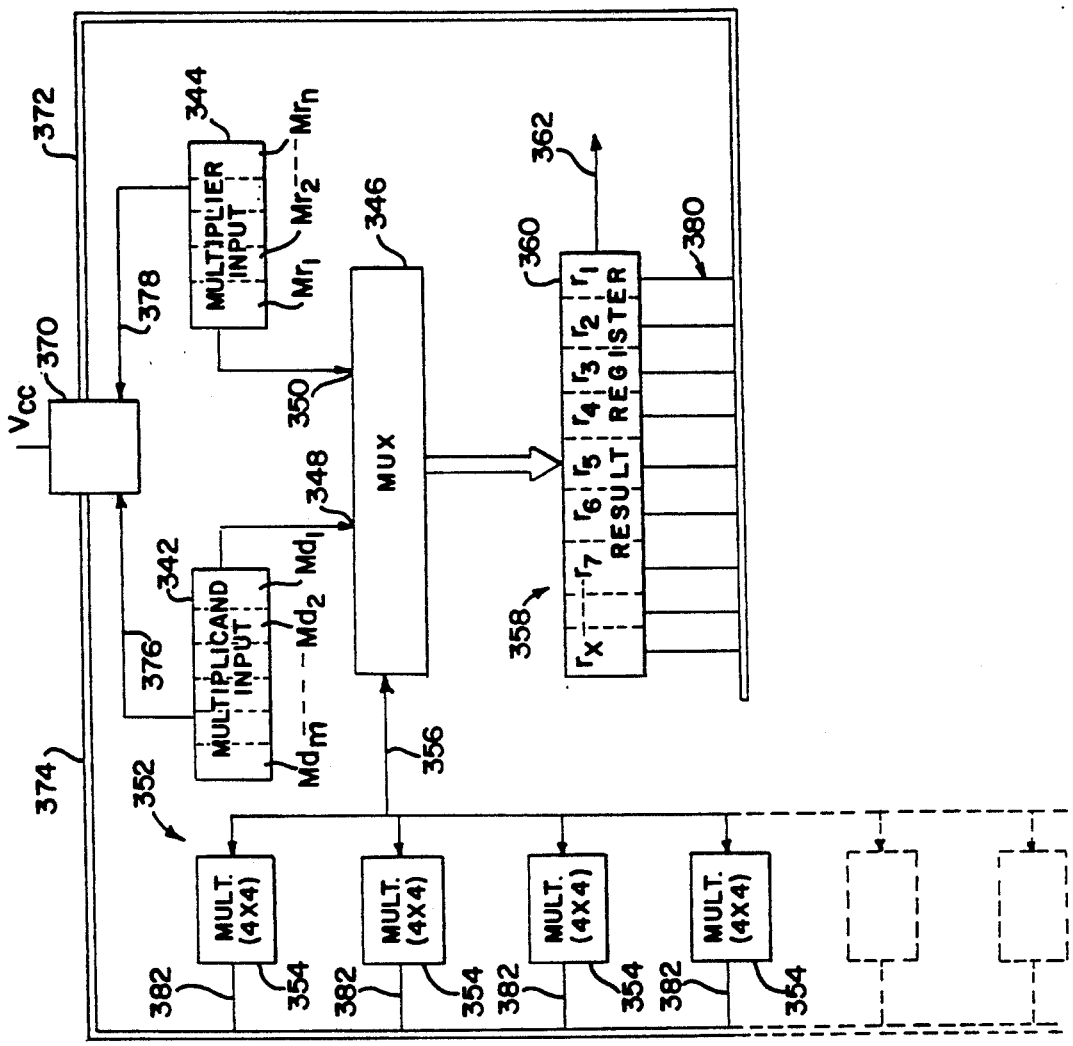
FIG. 8 is a schematic block diagram of an apparatus for providing power to selected portions of a multiplying device for carrying out the preferred embodiment of the method of the present invention.

FIG. 8 is a schematic block diagram of the preferred embodiment of an apparatus for providing power to selected portions of a multiplying device for carrying out the preferred embodiment of the method of the present invention.

For clarity of understanding, elements appearing in FIG. 8 which are similar to elements appearing in FIG. 7 are designated by similar reference numerals, increased by 100.

In FIG. 8, a multiplying apparatus 340 receives a multiplicand from a multiplicand input 342 and receives a multiplier from a multiplier input 344. Multiplicands $Md_1, Md_2, \ldots, Md_m$ may be queued in multiplicand input 342; multipliers $Mr_1, Mr_2, \ldots, Mr_n$ may be queued in multiplier input 344. The current multiplicand $Md_1$ to be used in a multiplication operation by multiplying apparatus 340 is received by multiplexer 346 at an input 348 and the current multiplier $Mr_1$ to be used in the multiplication operation with current multiplicand $Md_1$ is received at an input 350 of multiplexer 346.

An array 352 of multipliers 354 is operatively connected by a bus 356 with multiplexer 346. Multiplexer 346 is programmed to recognize the significance of the respective digits of the multiplicands $Md_m$ and the multipliers $Mr_n$ received at inputs 348, 350 so that, after routing respective pair-combinations of multiplicand digits and multiplier digits $(a_m, b_n,$ see FIG. 3) to appropriate multipliers 354 for multiplication to produce a respective partial product for each such pair-combination $(a_m, b_n)$. After receiving the respective partial products from array 352 of multipliers 354 via bus 356, multiplexer 346 directs accumulation of respective partial products in appropriate register cells 358 in result register 360 according to the significance of the multiplicand digit $a_m$ and the significance of the multiplier digit $b_n$ of the pair-combination involved in each respective partial product.

Result register 360 effects a shifting accumulation operation as described in connection with the preferred embodiment of the method of the present invention and, after completion of the shifting accumulation operation, the number residing in the array of register cells 358 is the product of the multiplicand $Md_m$ and multiplier $Mr_n$ received at inputs 348, 350 of multiplexer 346. That result is available for shifting through an output 362 either serially or in parallel as appropriate, for use or further processing by a system employing multiplying apparatus 340.

Multiplying apparatus 340 also includes a power control module 370 and power distribution buses 372, 374. Power control module 370 receives multiplicand inputs $Md_m$ via an input 376 and receives multiplier inputs $Mr_n$ via an input 378. Inputs 376, 378 may receive the current multiplicand $Md_1$ and the current multiplier $Mr_1$, or may receive an earlier (i.e., yet to be processed) multiplicand $Md_m$ and an earlier multiplier $Mr_n$, as indicated in FIG. 8.

The "powering up" of selected components of multiplying apparatus 340 in the contemplated preferred embodiment illustrated in FIG. 8 consists mainly in precharging field effect transistor (FET) switching devices. Such precharging may easily be accomplished in less than a clock cycle.

Power distribution bus 372 is operatively connected with result register 360 and, in particular, is operatively connected to selectively provide power to respective register cells $r_1, \ldots r_x$ via individual power lines 380. Power distribution bus 374 is operatively connected to selectively provide power to respective multipliers 354 via appropriate power lines 382.

Power control module 370 receives multiplicand inputs $Md_m$ and multiplier inputs $Mr_n$ and determines the sizes of a respective multiplicand input $Md_m$ and multiplier $Mr_n$ associated with a given multiplication operation. As discussed in connection with FIGS. 2 and 3, merely knowing the number of digits involved in a given multiplication operation enables determination of the number of register cells required to accommodate the preferred method of the present invention and, further, enables determination of the number of multipliers required for determining the respective partial products involved in practicing the preferred method of the present invention.

Power control module 370 may employ any appropriate means of a number of means for determining the sizes of multiplicands $Md_m$ and multipliers $Mr_s$. For example, the number of non-zero digits in a number may be counted, or the number of loading zeroes may be counted in a format comprising a predetermined number of digits.

Therefore, by way of example, power control module 370 may receive a multiplicand $Md_m$ comprising the digits $a_1, a_2, a_3, 0$ and may receive a multiplier $Mr_n$ comprising digits $b_1, b_2, b_3, b_4$. According to the alogorithmic relationship illustrated in FIG. 2, the number of registers $r_x$ required to accommodate the preferred method of the present invention involving a 3-digit multiplicand and a 4-digit multiplier may be determined as $r_x = m + n - 1 = (3 + 4 - 1) = 6$. Thus, power control module 370 may determine that six result registers, $r_x$, must be powered up to accommodate the multiplication operation involving the particular multiplicand $Md_m$ and $Mr_n$ presently sampled. Similarly, power control module 370 may determine that a 3-digit multiplicand $Md_m$ (i.e., $a_1, a_2, a_3, 0$) and a 4-digit multiplier $Mr_n$ (i.e., $b_1, b_2, b_3, b_4$) would require 12 (i.e., $3 \times 4$) partial products to be calculated. Accordingly, power control module 370 may determine that 12 multipliers 354 need power in order to accomplish the particular multiplication operation involved. Of course, as mentioned in connection with FIGS. 2 and 3, a designer may contemplate multi-cycle partial product calculations so that, if fewer than 12 multipliers 354 are available, another algorithmic relation must be applied by power control module 370 to determine the number of cycles required and the consequent number of multipliers 354 to be precharged to effect the particular multiplication desired.

Of course, either power distribution bus 372 or power distribution bus 374 may be omitted so that power to multipliers 354 only or power to result registers $r_x$ only is controlled.

It is to be understood that, while the detailed drawings and specific examples given describe preferred embodiments of the invention, they are for the purpose of illustration, that the apparatus of the invention is not limited to the precise details and conditions disclosed and that various changes may be made therein without departing from the spirit of the invention which is defined by the following claims:

I claim:

1. An apparatus for providing power to selected portions of a multiplying device, said multiplying device determining the product of a first number having a first plurality of digits and a second number having a second plurality of digits, said multiplying device comprising a plurality of components including a plurality of multiplier units for determining a plurality of partial products, said plurality of partial products comprising a respective partial product for each pair-combination of said first plurality of digits and said second plurality of digits, and including a register means for storing information, said register means including plurality of register cells for accumulatingly storing said plurality of partial products according to a predetermined arrangement; the apparatus comprising:

a comparing means operatively connected for receiving said first number and said second number and comparing said first plurality of digits with said second plurality of digits, said comparing means determining the highest number of digits contained in said first plurality of digits or said second plurality of digits; said comparing means being operatively connected with specified multiplier units of said plurality of multiplier units, with specified register cells of said plurality of register cells, and with a source of said power; said comparing means employing said highest number of digits in a predetermined algorithmic relation to selectively provide said power specified components of said plurality of components.

2. An apparatus for providing power to selected portions of a multiplying device as recited in claim 1 wherein said specified components comprise specified multipliers unit of said plurality of multiplier units.

3. An apparatus for providing power to selected portions of a multiplying device as recited in claim 1 wherein said specified components comprise specified register cells of said plurality of register cells.

4. An apparatus for providing power to selected portions of a multiplying device as recited in claim 2 wherein said specified components comprise specified register cells of said plurality of register cells.

5. An apparatus for controlling power delivery from a power source to selected portions of a multiplying device, said multiplying device determining the product of a first number having a first plurality of digits and a second number having a second plurality of digits, said multiplying device comprising a plurality of components, said plurality of components including a plurality of multiplier units for determining a plurality of partial products, said plurality of partial products comprising a respective partial product for each pair-combination of said first plurality of digits and said second plurality of digits, and including a register means for storing information, said register means including plurality of register cells for accumulatingly storing said plurality of partial products according to a predetermined arrangement; the apparatus comprising:
  a. power bus means for providing a plurality of controllable delivery paths for delivering said power from said power source to said multiplying device; and
  a control means for controlling said delivery paths to selectively effect operational connection between specified components of said plurality of components and said power source;
  said control means being operatively connected with said power source, with said power bus means, and with said specified components, said control means including a logic means for comparing said first number with said second number; said logic means being operatively connected to receive said first number and said second number at least as early as said multiplying device;
  said logic means determining the greater number of digits between said first number and said second number; said control means responding to said logic means employing said greater number of digits to selectively provide said power to specified components of said plurality of components.

6. An apparatus for controlling power delivery from a power source to selected portions of a multiplying device as recited in claim 5 wherein said specified components comprise specified multiplier units of said plurality of multiplier units.

7. An apparatus for controlling power delivery from a power source to selected portions of a multiplying device as recited in claim 5 wherein said specified components comprise specified register cells of said plurality of register cells.

8. An apparatus for controlling power delivery from a power source to selected portions of a multiplying device as recited in claim 6 wherein said specified components further comprise specified register cells of said plurality of register cells.

* * * * *